United States Patent

Minari et al.

[11] Patent Number: 5,471,911
[45] Date of Patent: Dec. 5, 1995

[54] COOKING APPARATUS SUCH AS FRYER OR THE LIKE FOR FRYING FOOD

[75] Inventors: Katsunobu Minari, Nagoya; Kaori Ueda, Toyoake, both of Japan

[73] Assignee: Hoshizaki Denki Kabushiki Kaisha, Toyoake, Japan

[21] Appl. No.: 411,863

[22] Filed: Mar. 28, 1995

Related U.S. Application Data

[63] Continuation of Ser. No. 972,017, Nov. 6, 1992, abandoned.

[30] Foreign Application Priority Data

| Mar. 9, 1992 | [JP] | Japan | 4-021342 U |
| Mar. 9, 1992 | [JP] | Japan | 4-021343 U |
| Mar. 9, 1992 | [JP] | Japan | 4-086385 |
| Mar. 9, 1992 | [JP] | Japan | 4-086386 |
| Sep. 28, 1992 | [JP] | Japan | 4-258354 |

[51] Int. Cl.⁶ .................................................. A47J 37/12
[52] U.S. Cl. ........................... 99/342; 99/403; 99/493
[58] Field of Search ........................ 99/330, 337, 342, 99/403, 410, 411, 468, 493

[56] References Cited

U.S. PATENT DOCUMENTS

| 3,731,520 | 5/1973 | Hickman et al. | 99/468 |
| 3,800,778 | 4/1974 | Löhr et al. | 99/468 |
| 4,585,925 | 4/1986 | Andre | 99/330 |
| 4,785,725 | 11/1988 | Tate et al. | 99/337 |
| 4,911,068 | 3/1990 | Koether et al. | 99/330 |
| 4,920,948 | 5/1990 | Koether et al. | 99/468 |
| 5,048,400 | 9/1991 | Ueda et al. | 99/468 |
| 5,101,717 | 4/1992 | Manser et al. | 99/468 |
| 5,365,039 | 11/1994 | Chaudoir | 99/468 |

FOREIGN PATENT DOCUMENTS 60-198118 10/1985 Japan.

Primary Examiner—David Scherbel
Assistant Examiner—James F. Hook
Attorney, Agent, or Firm—Nikaido, Marmelstein, Murray & Oram

[57] ABSTRACT

In a cooking apparatus such as a fryer or the like for frying food having an oil tank filled therein with cooking oil to be maintained in heated condition, a humidity detector is provided to detect an amount of vapor rising from the food after the food has been thrown into the heated cooking oil. An electric circuit is provided to decide frying completion of the food when the detected amount of vapor becomes smaller than a predetermined amount of vapor after maintained larger than the predetermined amount of vapor.

6 Claims, 20 Drawing Sheets

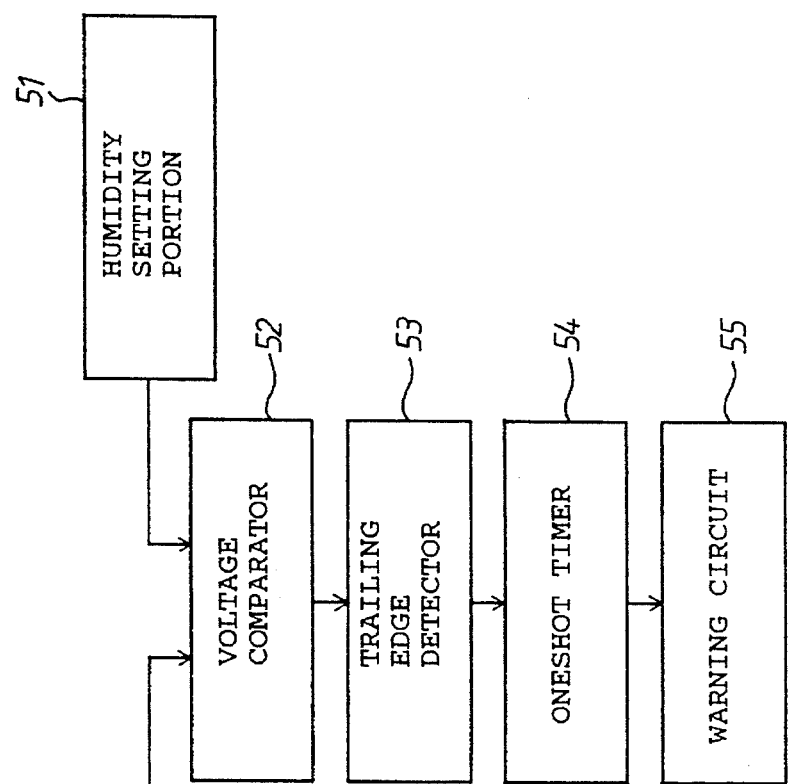
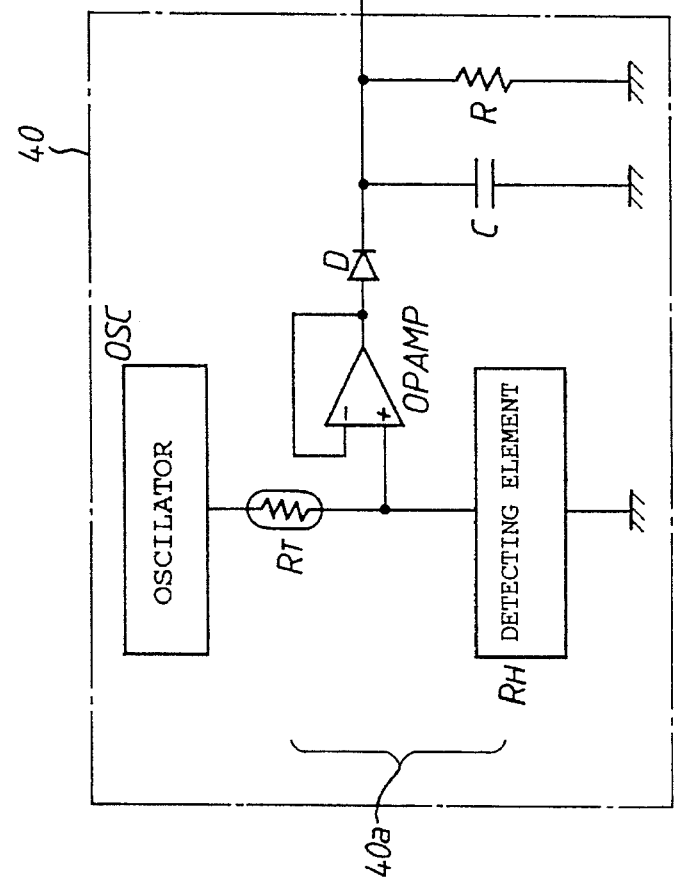
Fig. 6

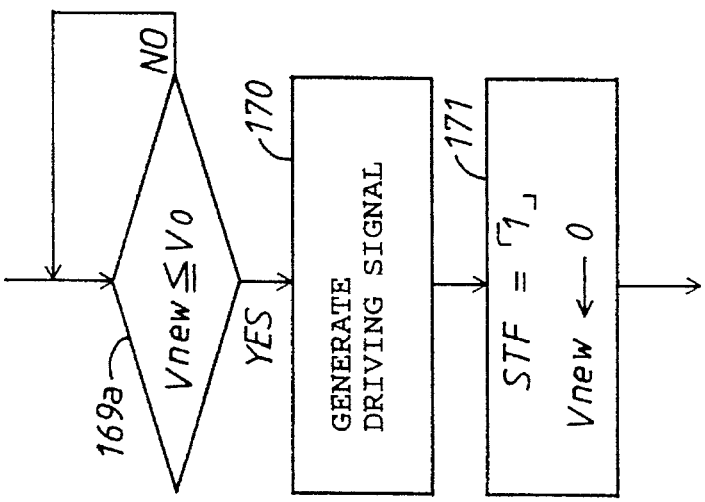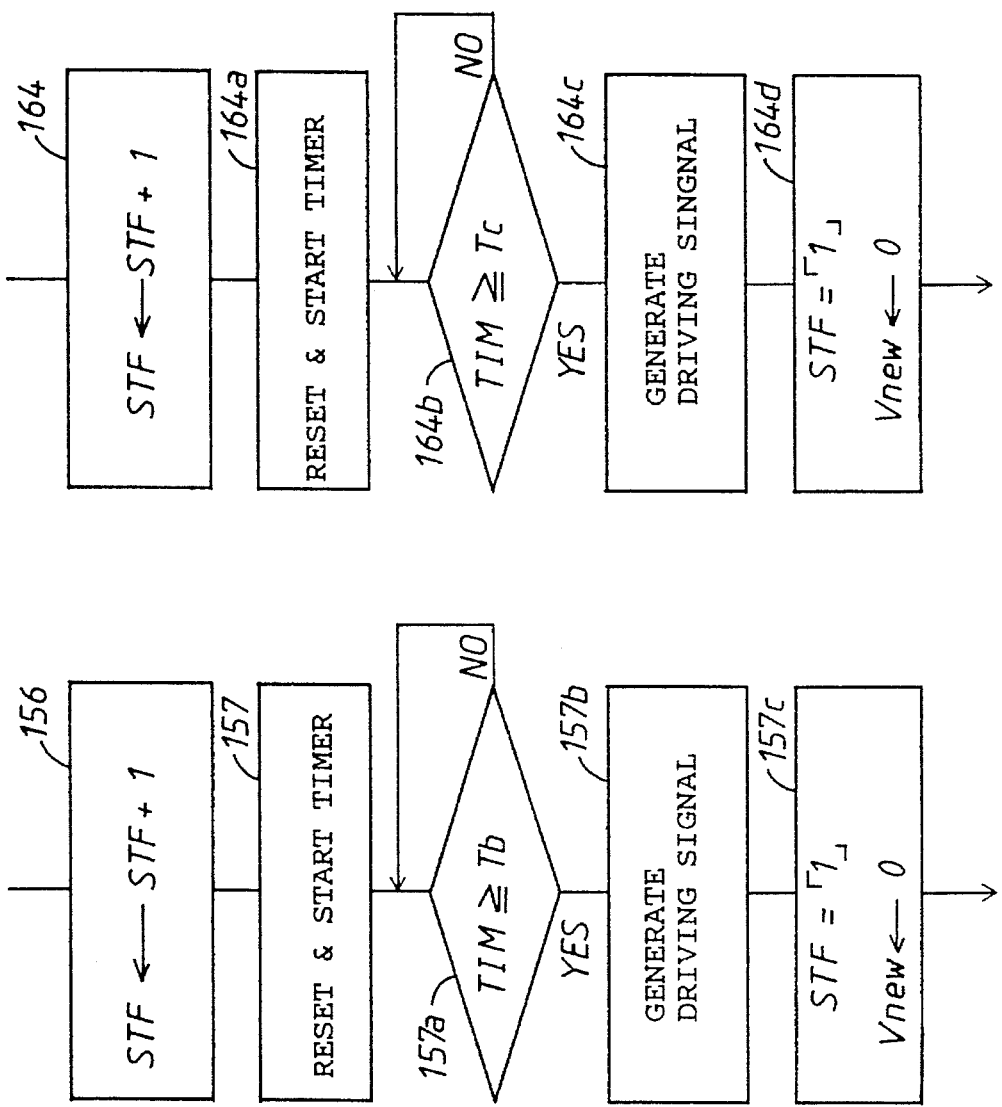

COOKING APPARATUS SUCH AS FRYER OR THE LIKE FOR FRYING FOOD

This application is a continuation of application Ser. No. 07/972,017 filed Nov. 6, 1992 now abandoned.

BACKGROUND OF THE INVENTION

1. Field of the Invention

The present invention relates to a cooking apparatus such as a fryer or the like for frying food.

2. Discussion of the Prior Art

In such a fryer disclosed in the publication No. 60-198118, there is provided a cooking timer which includes a temperature detector for detecting a temperature of cooking oil and an oscillator circuit for changing an oscillation frequency thereof in accordance with the detected oil temperature or switching-over of a proper switch given by the kind of frying materials. The cooking timer also includes a frequency divider for measuring a predetermined time in accordance with change of the oscillation frequency to define finish in cooking after measurement of the predetermined time.

With this construction, it is possible that a cooking time for the cooking materials is properly adjusted in accordance with a change of the oscillation frequency to ensure cooking suitable for the kind or quantity of the cooking materials. However, the detected oil temperature may not define directly changes of cooking condition of the frying materials. This means, therefore, that for determining completion of frying the frying materials by use of the detected oil temperature, complicated processing is required in accordance with the kind or quantity of the frying materials. This significantly increases production cost of the fryer.

SUMMARY OF THE INVENTION

It is, therefore, a primary object of the present invention to provide a cooking apparatus such as a fryer or the like for frying food, capable of directly detecting changes of frying condition of food to accurately determine frying completion of the food in a simple manner.

It is another object of the present invention to provide a cooking apparatus, having the above-mentioned characteristics, capable of accurately detecting when food is placed into cooking oil in a simple manner to determine frying completion of the food after lapse of a predetermined time.

It is further object of the present invention to provide a cooking apparatus, having the above-mentioned characteristics, capable of directly detecting changes of frying condition of food for a variety of types of food to accurately determine frying completion of the food in a simple manner.

According to the present invention, the foregoing objects are attained by providing a cooking apparatus such as a fryer or the like for frying food having an oil tank filled therein with cooking oil to be maintained in a heated condition. The cooking apparatus comprises;

detection means for detecting an amount of vapor rising from the food after the food has been thrown into the heated cooking oil, first means for generating a reference signal indicative of a predetermined amount of vapor, and second means for deciding frying completion of the food when the detected amount of vapor becomes smaller than a value of the reference signal after maintained larger than the value of the reference signal.

In an aspect of the present invention, there is provided a cooking apparatus such as a fryer or the like for frying food having an oil tank filled therein with cooking oil to be maintained in heated condition. The cooking apparatus comprises;

detection means for detecting an amount of vapor rising from the food after the food has been placed into the heated cooking oil;

first means for deciding as to whether or not the detected amount of vapor has reached a predetermined amount of vapor immediately after throw of the food into the heated oil, if so generating an decision signal; and second means responsive to the decision signal for measuring a predetermined time required for frying completion of the food and for deciding frying completion of the food at the end of measurement of the predetermined time.

In another aspect of the present invention, there is provided a cooking apparatus such as a fryer or the like for frying food having an oil tank filled therein with cooking oil to be maintained in heated condition, the food being frying materials of which an interior portion needs not to be heated. The cooking apparatus comprises ;

detection means for detecting an amount of vapor rising from the food after the food has been thrown into the heated cooking oil; and means for deciding as to whether or not the detected amount of vapor has reached the peak thereof. If so, frying completion of the frying materials is determined.

In still another aspect of the present invention, there is provided a cooking apparatus such as a fryer or the like for frying food having an oil tank filled therein with cooking oil to be maintained in heated condition. The cooking apparatus comprises;

mode selection means for selecting a first frying mode when the food is frying materials of which interior portion needs not to be heated and for selecting a second frying mode when the food is frying materials other than the frying materials of which interior portion needs not to be heated;

detection means for detecting an amount of vapor rising from the food after the food has been thrown into the heated cooking oil;

first means for deciding as to whether or not the detected amount of vapor has reached the peak thereof in the selected first frying mode, if so deciding frying completion of the frying materials; and second means for deciding as to whether or not a predetermined time lapses after the detected amount of vapor has reached the second peak thereof in the selected second frying mode, if so deciding frying completion of the frying materials.

BRIEF DESCRIPTION OF THE DRAWINGS

Other objects, features and advantages of the present invention will be readily appreciated from the following detailed description of preferred embodiments thereof when considered with reference to the accompanying drawings, in which:

FIG. 6 illustrates an electric circuit diagram for the first embodiment of the fryer;

FIG. 12 is a partial flow chart of a fifth preferred embodiment in accordance with tile present invention;

FIG. 13 is a partial flow chart of a sixth preferred embodiment in accordance with the present invention;

FIG. 14 is a partial flow chart of a seventh preferred embodiment in accordance with the present invention;

DESCRIPTION OF THE PREFERRED EMBODIMENTS

Figure 1:
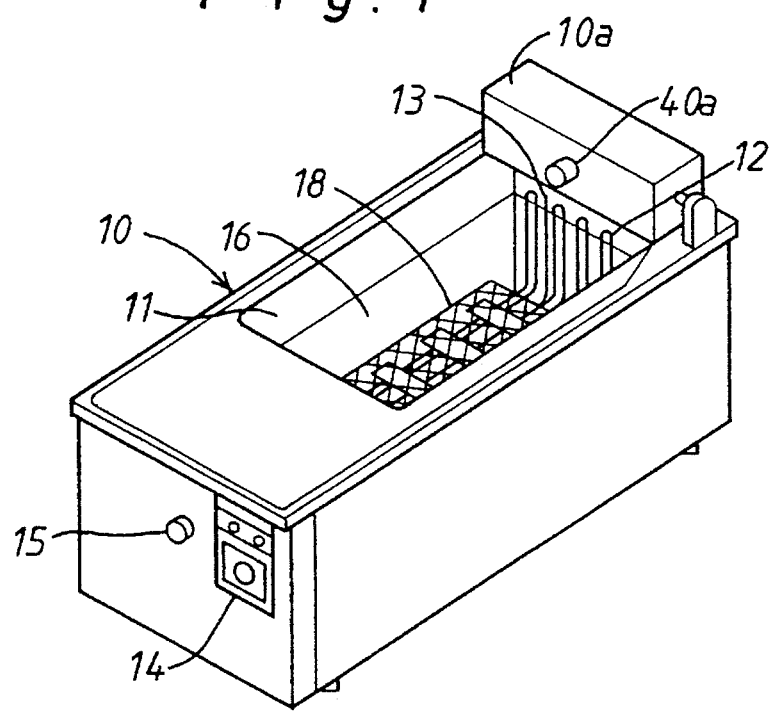
FIG. 1 is a slant view of a first preferred embodiment of a fryer in accordance with the present invention.
Figure 2:
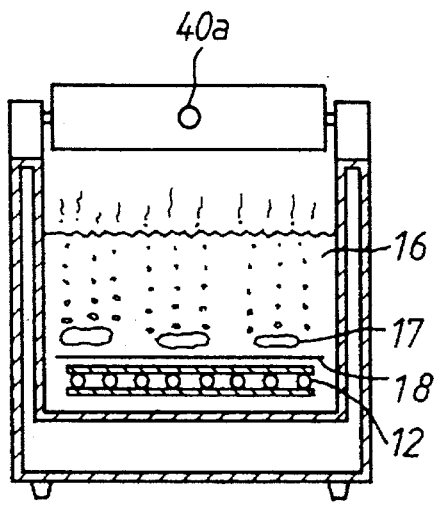
FIG. 2 illustrates condition of frying materials immediately after being placed into an tank.

Referring now to FIG. 1 of the accompanying drawings, there is illustrated a fryer of a first preferred embodiment in accordance with the present invention. The fryer has a body 10 which is provided therein with an oil tank 11 in which a predetermined amount of cooking oil 16 is filled. the oil tank 11 includes a pipe type heater 12 which is arranged on inner rear and bottom walls of the oil tank 11. The heater 12 is operated in response being supplied with electric power from an electric power source (not shown) caused by actuation of a power switch 15. A mesh plate 18 is provided on the heater 12 to prevent frying materials from coming into direct contact with the heater 12. A temperature sensor 13 is arranged within the oil tank 11 near the heater 12 to detect temperature of the oil 16. An oil temperature adjuster 14 is fixed on a front surface of the fryer body 10 and cooperates with the temperature sensor 13 to control operation of the heater 12 in such a manner to maintain the temperature of the oil 16 at a predetermined temperature.

Prior to a detailed explanation of the electric circuit construction for warning frying completion by the fryer according to the present invention, the inventors have in detail investigated various phenomena in frying process of frying materials of various types. A brief discussion of these phenomena will be helpful in understanding the environment of the invention.

When a cook throws watery frying materials 17 into the oil tank 11 while the oil 16 is heated in predetermined temperature under adjustment of the temperature adjuster 14 (see a point A in FIG. 4), moisture of the frying materials 17 permeates into the heated oil 16, where it becomes and heated and then vaporized. Thus, large quantities of vapor rises up from a surface of the oil 16 to form a first peak (see a point C in FIG. 4). When surfaces of the frying materials 17 are heated and hardened, it becomes more difficult for moisture in the interior of the frying materials 17 to be released outward from the surfaces of the frying materials 17. Thus, an amount of vapor upon the oil surface begins to decrease toward to the minimum amount (refer to the point C to a point D in FIG. 4). At this stage, the frying materials 17 remain submerged in the oil toward a bottom portion of the oil tank 11.

Figure 3:
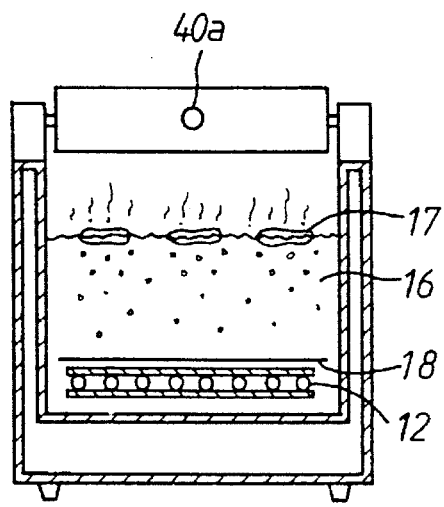
FIG. 3 illustrates condition of the frying materials near frying completion thereof.
Figure 4:
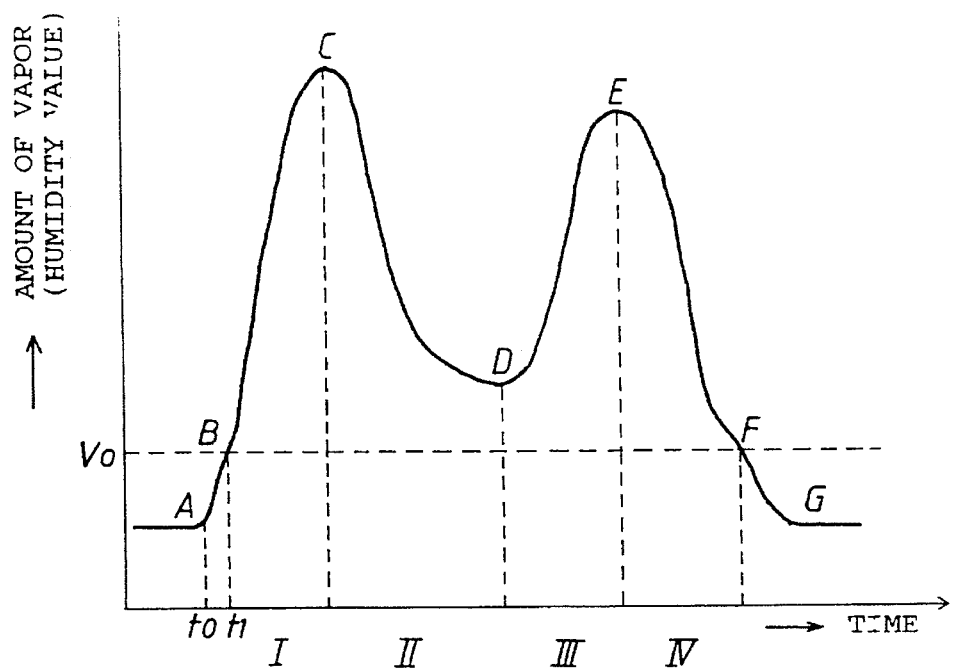
FIG. 4 depicts a characteristic curve indicative of change of an amount of vapor rising from typical frying materials in relation with time.

When the frying materials 17 are continuously heated, temperature in the interior of the frying materials 17 rises gradually, and moisture in the interior of the frying materials 17 begins to be vaporized and released out through the surfaces of the frying materials 17 (refer to the point D to a point E in FIG. 4). Thus, the moisture in the interiors of the frying materials 17 is released from the frying materials 17. When weight of the frying materials 17 decreases gradually, the frying materials 17 rise to the oil surface (see FIG. 3). As a result, the moisture in the frying materials 17 is released easily out from the frying materials 17 to increase an amount of moisture rising from the oil surface up to a second peak (see the point E in FIG. 4). In addition, such floating phenomena of the frying materials 17 are known by experienced cooks as a standard for estimating frying completion of the frying materials.

When the frying materials 17 is further continuously heated, an amount of the vapor decreases down to a predetermined amount corresponding to a predetermined value Vo of humidity (see a point F of FIG. 4). At this stage, the interiors of the frying materials 17 have been substantially heated fully, very little moisture in the frying materials 17 is released. This represents completion in frying the frying materials 17. Furthermore, it is known that the predetermined value Vo is maintained substantially in a constant in any kinds of the frying materials 17.

When the frying materials 17 are further heated, an amount of the vapor further decreases substantially down to a predetermined amount (see a point G in FIG. 4), wherein moisture in the frying materials 17 are decreased so much as to cause an overfrying condition of the frying materials 17. As examples of the above-mentioned frying materials, given are such frying materials as pork cutlets, croquettes, fried meats and the like.

While the above-mentioned phenomena are applicable to most of frying materials, there are certain types of frying materials in which an amount of vapor changes in tendency different from the changing tendency of the characteristic curve in FIG. 4 after it has risen up to the first peak of an amount of the vapor as described above. In other words, the certain kind of frying materials provides a changing tendency in an amount of vapor shown in FIG. 5 wherein an amount of the vapor unevenly decreases continuously and converges to the predetermined amount corresponding to the value Vo.

As a reason showing change of the vapor amount as described above, it is given that due to difficulty in release of moisture from the frying materials outward, the flying materials 17 remain in the oil 16 to gradually release moisture thereof outward and to rise vapor therefrom when floated on the oil surface. When an amount of the vapor has reached the predetermined amount corresponding to the predetermined value Vo, the interiors of the frying materials are substantially heated fully, as previously described. This means that the frying materials have been completely fried in the condition that a desired amount of moisture is held in the frying materials. Furthermore, it is experimentally recognized that the predetermined value Vo takes substantially a constant in any kinds of frying materials defined by the characteristic curve in FIG. 4. As an example of foods indicating a change of such a vapor amount, meat balls and the like are given.

From the above description, it may be understood that an amount of vapor rising through the oil surface from the frying materials increases to an amount corresponding to more than the predetermined value Vo and thereafter decreases down to an amount corresponding to less than the predetermined value Vo. It may be also understood that the predetermined value Vo takes substantially a constant defining frying completion of the frying materials in any kind of the frying materials. As a result, it is possible to simply detect accurately frying completion of the frying materials by utilizing the above-mentioned phenomena.

The construction of the electric circuit based on the above mentioned phenomena is explained later with respect to FIG. 6. A humidity detector 40 includes a detecting element RH of which the resistance value varies in accordance with humidity. The detecting element RH is grounded at one end and connected at the other end through an NTC thermistor RT for temperature compensation to an oscillator OSC which outputs an alternating signal with a predetermined frequency, for example 1 (kHz). A buffer or operational amplifier OP AMP is connected at its positive input terminal to a common terminal of the detecting element RH and the NTC thermistor RT. A capacitor C and a resistor R are connected with each other to form a smoothing circuit and are connected to an output terminal of the operational amplifier OP AMP through a diode D in the form of a rectifier.

A detecting portion 40a of the humidity detector 40 is composed of the detecting element RH and thermistor RT, as described above and is provided on an inner upper portion of a rear wall 10a of the oil tank 11. Then, the detecting element RH detects vapor rising from the frying materials 17 in the oil tank 11 and changes a resistance value thereof in accordance with humidity of the detected vapor to convert it into a voltage value. Thus, the humidity detector 40 outputs a voltage signal indicative of a humidity value V in accordance with the converted voltage value.

A voltage comparator 52 is connected at its one input terminal to the output terminal of the humidity detector 40 and is connected at its other input terminal to a humidity setting portion 51. The humidity setting portion 51 is set to produce a setting voltage V1 indicative of the predetermined value Vo defining frying completion of the frying materials 17. The voltage comparator 52 compares the humidity value V from the humidity detector 40 with the setting voltage V1. When the humidity value V is larger than the setting voltage V1, the voltage comparator 52 generates a comparison signal with a high level H therefrom. When the humidity value V is smaller than the setting voltage V1, the voltage comparator 52 generates a comparison signal with a low level L therefrom.

A trailing edge detector 53 detects a high-to-low change in a level of the comparison signal from the voltage comparator 52 to generate a trailing edge pulse signal therefrom. A one shot timer 54 is responsive to the trailing edge pulse signal from the trailing edge detector 53 to generate a pulse signal having a predetermined time duration. A warning circuit 55 is driven in response to the pulse signal from the one shot timer 54 to warn frying completion of the frying materials 17 to the cook.

In operation, when the power switch 15 is actuated, the heater 12 is supplied with the electric power from the electric source to heat the cooking oil 16 in the oil tank 11. Then, the heater 12 maintains temperature of the oil 16 at the predetermined temperature under control of the oil temperature adjuster 14 which is cooperable with the temperature sensor 13. At this stage, the detecting element RH of the humidity detector 40 is maintained in humidity-detectable condition in response to an alternating signal from the oscillator OSC. The humidity setting portion 51 is set to generate a setting voltage V1 corresponding to an output of the humidity detector 40 at frying completion of the frying materials 17. In addition, each circuit element of the above-mentioned electric circuit is supplied with the electric power from the electric source in response to actuation of the power switch 15.

When the cook places the frying materials 17 into the oil tank 11 (refer to the point A in FIGS. 4 and 5), moisture of the frying materials 17 permeates into the cooking oil 16 and is then heated by the high temperature oil 16 to vapor, almost instantaneously. Thus, a large amount of vapor rises to the oil surface (see FIGS. 4 and 5). When a humidity value V exceeds the predetermined value Vo as an amount of the vapor increases, the voltage detector 52 outputs a comparison signal with a high level H therefrom.

As the frying condition of the frying materials 17 approaches frying completion, an amount of moisture in the frying materials 17 decreases, and the humidity value V reduces to a value which is below the predetermined value Vo (see the point F of FIGS. 4 and 5). Thus, the voltage comparator 52 outputs a comparison signal with a low level L. Then, the trailing edge detector 53 detects a high-to-low change in a level of the comparison signal from the voltage comparator 52 to generate a trailing edge pulse signal. As a result, the one shot timer 54 is responsive to the trailing edge pulse signal from the trailing edge detector 53 to generate a single pulse signal with a predetermined time duration upon receipt of which the warning circuit 55 is driven to warn frying completion of the frying materials 17 to the cook.

As understood from the above description, an amount of vapor rising from the frying materials 17 increases to more than the predetermined amount after the frying materials 17 were thrown into the oil tank 11. When decrease of an amount of the vapor down to less than the predetermined value is detected by processing of the humidity value V from the humidity detector 40, the cook may be warned to simply recognize accurately frying completion of the frying materials 17.

Figure 7:
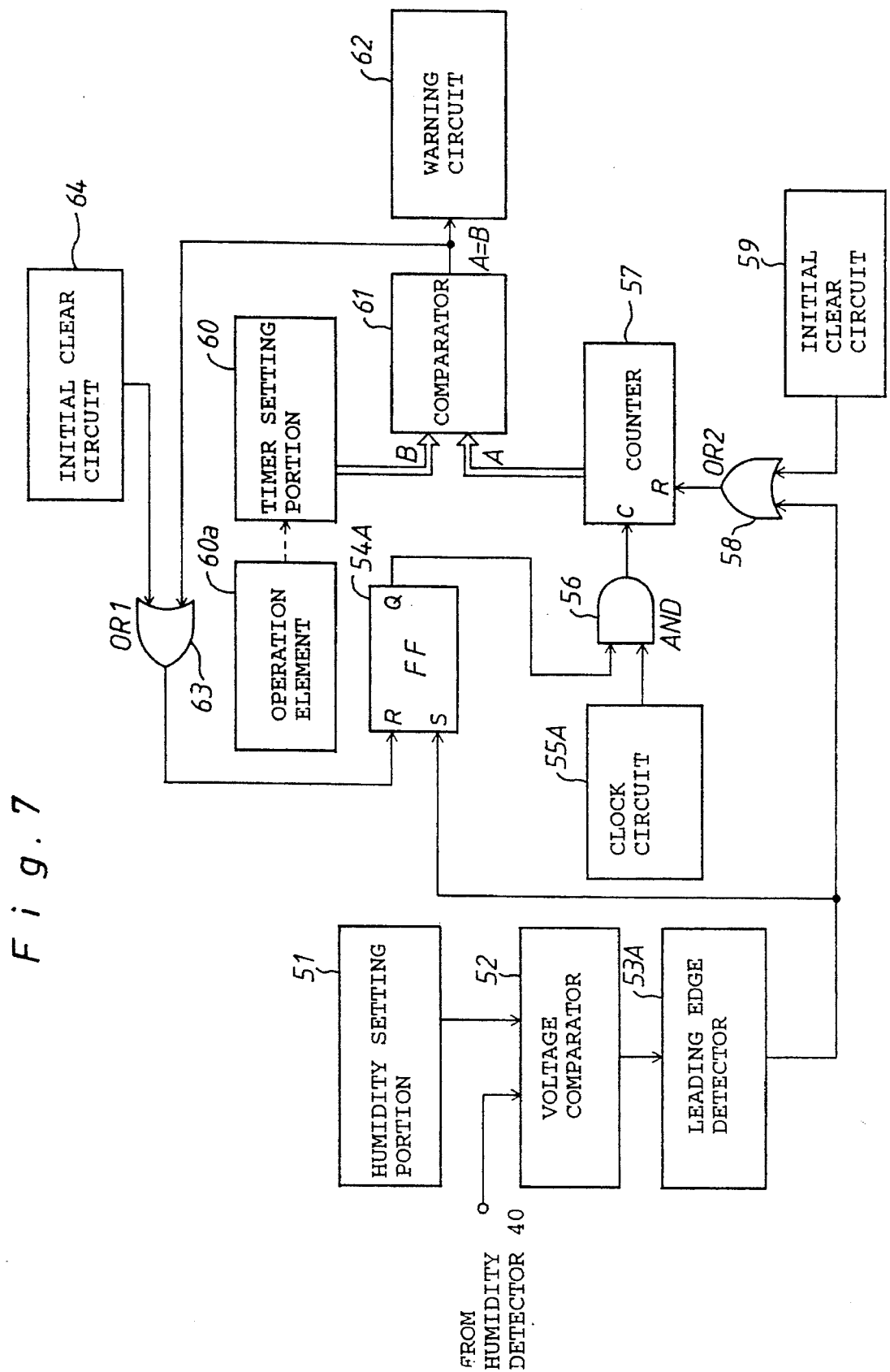
FIG. 7 illustrates a partial circuit diagram of a second preferred embodiment in accordance with the present invention.

FIG. 7 illustrates a second preferred embodiment according to the present invention, which is characterized in that the trailing edge detector 53, one shot timer 54 and warning circuit 55 described in the previous embodiment (see FIG. 6) is replaced with an electric circuit construction composed of a leading edge detector 53A through an initial clear circuit 64 shown in FIG. 7. The leading edge detector 53A detects a low-to-high change in a level of a comparison signal from the voltage comparator 52 described in the previous embodiment to generate a leading edge pulse signal therefrom.

The flip-flop 54A is set responsive to the leading edge pulse signal from the leading edge detector 53A to produce an output signal with a high level H at its output terminal Q. The clock circuit 55A produces clock pulses respectively with a predetermined time duration therefrom. The AND-gate 56 is responsive to the output signal with the high level H from the flip-flip 54A to output the clock pulse from the clock circuit 55A therethrough. The counter 57 is reset in response to the leading edge pulse signal from the leading edge detector 53A through an OR-gate 58 and counts the number of the clock pulses from AND-gate 56 to output a count signal A indicative of the counted number of the clock pulses.

The time setting portion 60 produces a time signal B indicative of a predetermined time duration which is set by the operation element 60a. The comparator 57 compares the count signal A from the counter 57 with the time signal B from the time setting portion 60 to generate a measuring end signal when each value of the count and time signals A and B are equal with each other. The warning circuit 62 is responsive to the measuring end signal from the comparator 61 to warn frying completion of the frying materials 17 to the cook. The OR-gate 63 resets the flip-flop 54A in response to the measuring end signal from the comparator 61. The initial clear element 59 resets the counter 57 by way of the OR-gate 58 in response to actuation of the power switch described previously. The initial clear element 64 resets the flip-flop 54A by way of the OR-gate 63 in response to actuation of the power switch described previously.

Incidentally, explained are the grounds for setting a predetermined time duration of the time setting portion 60 into a predetermined time duration To, as described later. In the previous embodiment, it has been described to simply detect accurately frying completion of the frying materials 17 by using the predetermined value Vo which has a substantially constant defining frying completion of the frying materials 17 in the frying phenomena with respect to FIGS. 4, 5. In this case, it is also possible to detect frying completion of the frying materials 17, by using a necessary time duration in which an amount of the vapor increases to an amount corresponding to more than the predetermined value Vo and thereafter decreases down to an amount corresponding to less than the same predetermined value Vo. Thus, the necessary time duration is set into the predetermined frying time duration To in the second embodiment.

Figure 5:
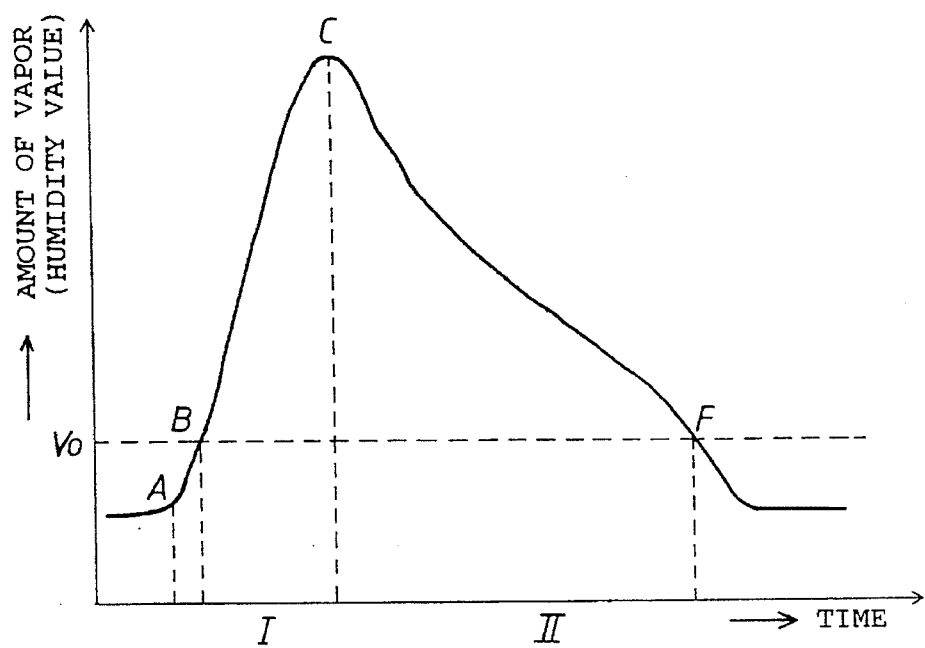
FIG. 5 depicts a characteristic curve indicative of change of an amount of vapor rising from special frying materials in relation with time.

In this case, a time duration (t1–t2) required for change from the point A to the point B of the characteristic curves of FIGS. 4, 5 is only a few seconds; this time duration is negligible in comparison with a time duration required for frying completion of the frying materials. Thus, start timing for measuring the predetermined time duration To may be regarded as the timing t1 at the point B. By using the phenomena, it is possible to automatically detect accurately the timing at which the frying materials are thrown into the oil tank 11, and it is also possible to warn frying completion of the frying materials to the cook after a lapse of the frying time duration To. Additionally, other construction is the same as that of the first embodiment.

In operation, when the power switch is actuated, temperature of the cooking oil 16 is maintained in the predetermined temperature, the humidity detector 40 is conditioned in the humidity-detectable state, and the humidity setting portion 51 outputs a setting voltage Vo, as described in the previous embodiment. Furthermore, each element of the above-mentioned electric circuit is supplied with the electric power from the electric source, the flip-flop 54A and counter 57 are reset by the initial clear circuits 59, 64 respectively. The time setting portion 60 is set by the operator element 60a to generate a time signal B therefrom.

When the cook throws the frying materials 17 into the oil tank 11 (refer to the point A in FIGS. 4 and 5), moisture of the frying materials 17 permeates into the cooking oil 16 and is then heated by the high temperature oil 16 to vapor instantaneously. Thus, a large amount of vapor rises upon the oil surface (see FIGS. 4 and 5). When a humidity value V becomes more than the predetermined value Vo as an amount of the vapor increases, the voltage detector 52 outputs a comparison signal with a high level H. The leading edge detector 53A generates a leading edge pulse signal in response to a timing of a low-to-high change in a level of the comparison signal from the voltage detector 52.

Then, the flip-flop 54A receives the leading edge pulse signal from the leading edge detector 53A to produce an output signal with a high level H at the output terminal Q in response to which the AND-gate 56 outputs therethrough clock pulses from the clock circuit 55A to the counter 57. Subsequently, the counter 57 starts to count the number of the clock pulses from the AND-gate 56 after it is reset in response to the leading edge pulse signal from the leading edge detector 53A. Then, the counter 57 produces a count signal A indicative of the counted number of the clock pulses. When a value of the time signal B from the time setting portion 60 is equal to a value of the count signal A from the counter 57, the comparator 61 generates a measuring end signal therefrom, upon receipt of which the warning circuit 62 warns frying completion of the frying materials 17 to the cook.

As understood from the above description, an amount of vapor rising from the frying materials 17 immediately after the frying materials 17 has been thrown into the oil tank 11 is detected by the humidity detector 40. This means that timing at which the frying materials 17 has been thrown into the oil tank 11 is automatically and accurately detected by the humidity detector 40. Thus, on a basis of this detected timing, a predetermined time is measured and completed to warn frying completion of the frying materials to the cook. Thus, the cook may recognize simply and accurately frying completion of the frying materials 17.

Figure 8:
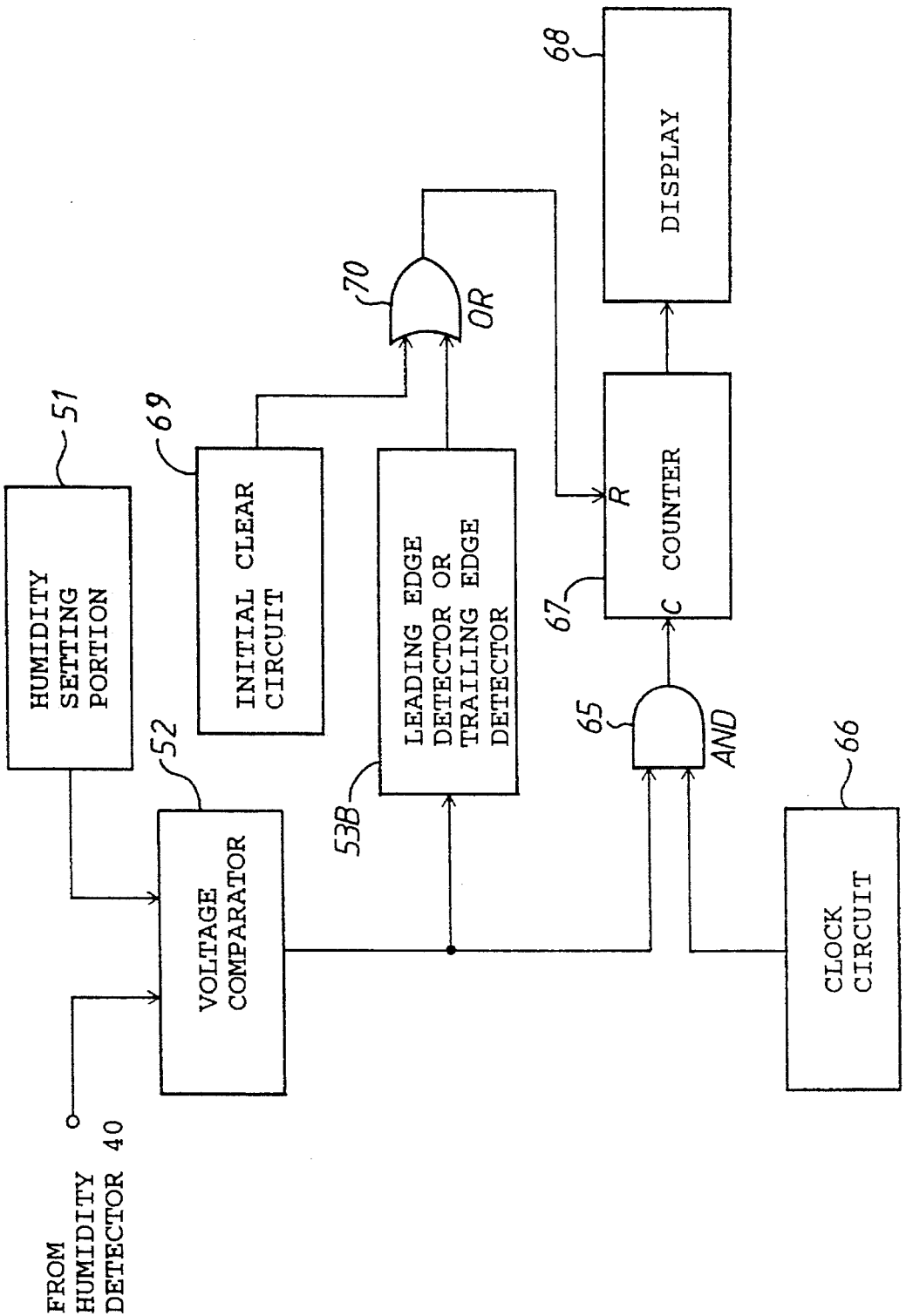
FIG. 8 illustrates a partial circuit diagram of a third preferred embodiment according to the present invention.

FIG. 8 illustrates a third preferred embodiment in accordance with the present invention, which is characterized in that the leading edge detector 53, one shot timer 54 and warning circuit 55 (see FIG. 6) described in the first embodiment are replaced with a leading edge detector 53B - an initial clear circuit 69 shown in FIG. 8.

The clock circuit 66 issues clock pulses respectively with a predetermined frequency. The AND-gate 65 receives the comparison signal with the high level H from the voltage comparator 52 to output the clock pulses from the clock circuit 66 therethrough. The leading edge detector 53B detects a low-to-high change in level of the comparison signal from the voltage comparator 52 to generate a leading edge pulse signal. The counter 67 counts the number of the clock pulses from the AND-gate 65. In this case, the counter 67 is reset by the OR-gate 70 cooperable with the initial clear circuit 69 upon actuation of the power switch and is also reset by the OR-gate 70 responsive to the leading edge pulse signal from the leading edge detector 53B.

The display 68 is in the form of the digital or analog type which displays the counted number of the clock pulses from the counter 67. In addition, the leading edge detector 53B may be replaced with a trailing edge detector, as shown in FIG. 8. In this instance, the counter 67 is reset by the OR-gate 70 at the end timing in count operation of the counter 67 corresponding to the timing in change of the high-to-low level of the comparison signal from the voltage comparator 52. Other construction is the same as that of the above mentioned first embodiment.

In operation, when the power switch is actuated, the cooking oil 16 is maintained in the predetermined temperature, the humidity detector 40 is conditioned in the humidity-detectable state, and the humidity setting portion 51 is set to output the setting voltage V1, as previously described. Furthermore, the above circuit elements are supplied with the electric power from the electric source, the counter 67 is reset by the initial clear circuit 69, and the clock circuit 66 issues clock pulses.

When a humidity value V detected by the humidity detector 40 becomes more than the predetermined voltage Vo as an amount of vapor increases after the frying materials 17 are placed into the oil tank 11, it is compared by the voltage comparator 52 with the setting voltage V1 to be issued as a comparison signal with a high level H from the voltage comparator 52. Then, the AND-gate 65 is responsive to the comparison signal from the voltage comparator 52 to output clock pulses from the clock circuit 66 therethrough. At the same time, the leading edge detector 53B detects change in the low-to-high level of the comparison signal from the voltage comparator 52 to output a leading edge pulse signal to the OR-gate 70 which resets the counter 67. Thus, the counter 67 starts to count the number of clock pulses from the AND-gate 65, and the display 68 displays the counted result in the analog or digital form. When the predetermined time lapses after recognition of the displayed contents, frying completion of the frying materials 17 may be warned to the cook.

As understood from the above description, an amount of vapor rising from the frying materials 17 immediately after the frying materials 17 are placed into the oil tank 11 is automatically detected accurately by the humidity detector 40 to define the timing when the frying materials 17 are placed into the oil tank 11. Thus, on a basis of this detection, measurement of the predetermined time is performed to indicate on the display 68 in digital or analog form. As a result, the cook may accurately recognize frying completion of the frying materials upon lapse of a predetermined time after throw of the frying materials into the oil tank 11 without any setting of a time required for finishing frying of the frying materials. In this case, warning of frying completion of the frying materials may be repetitively done because the counter 67 is reset by the leading or trailing edge detector 53B.

Figure 9:
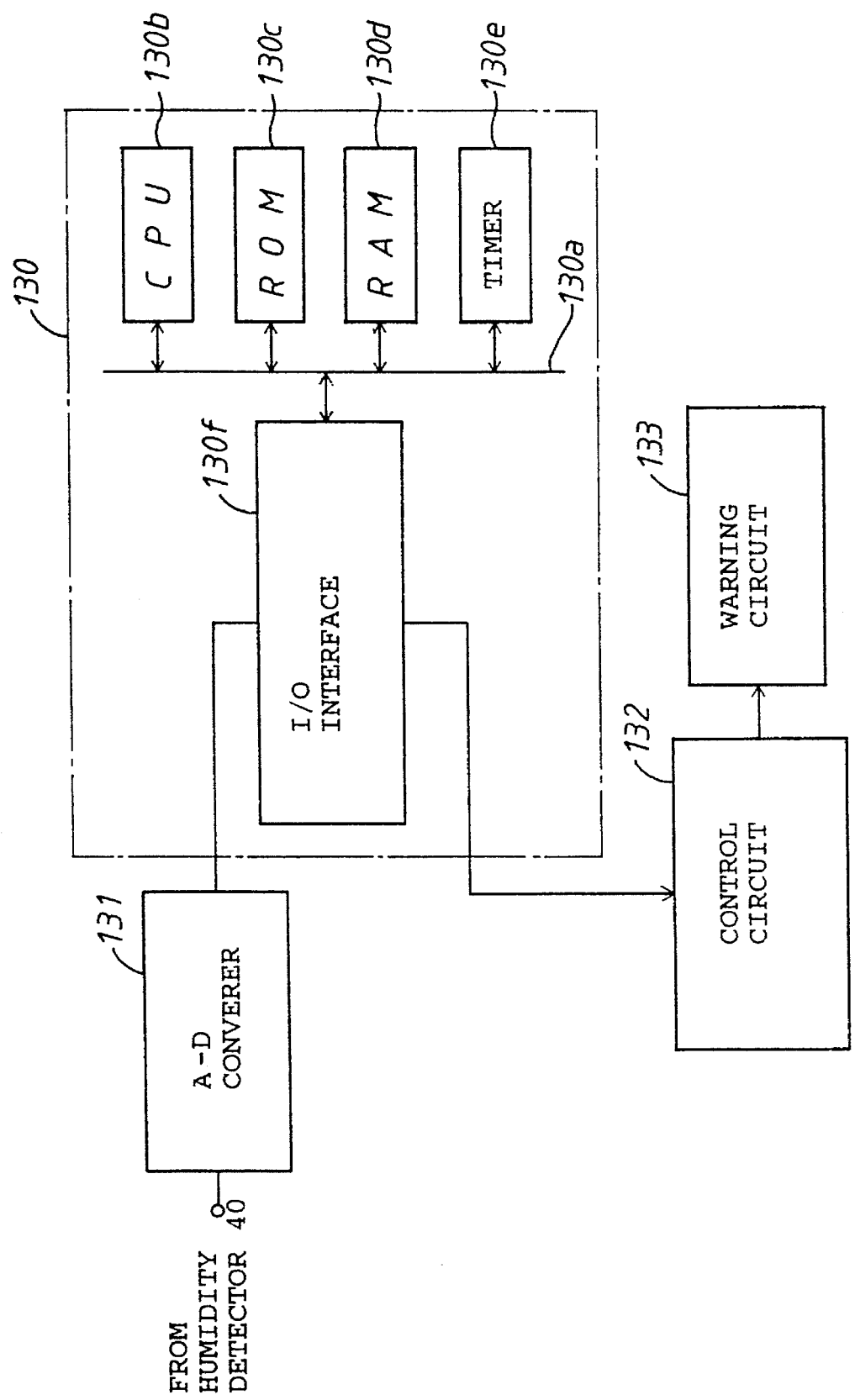
FIG. 9 illustrates a partial circuit diagram of a fourth preferred embodiment according to the present invention.
Figure 10:
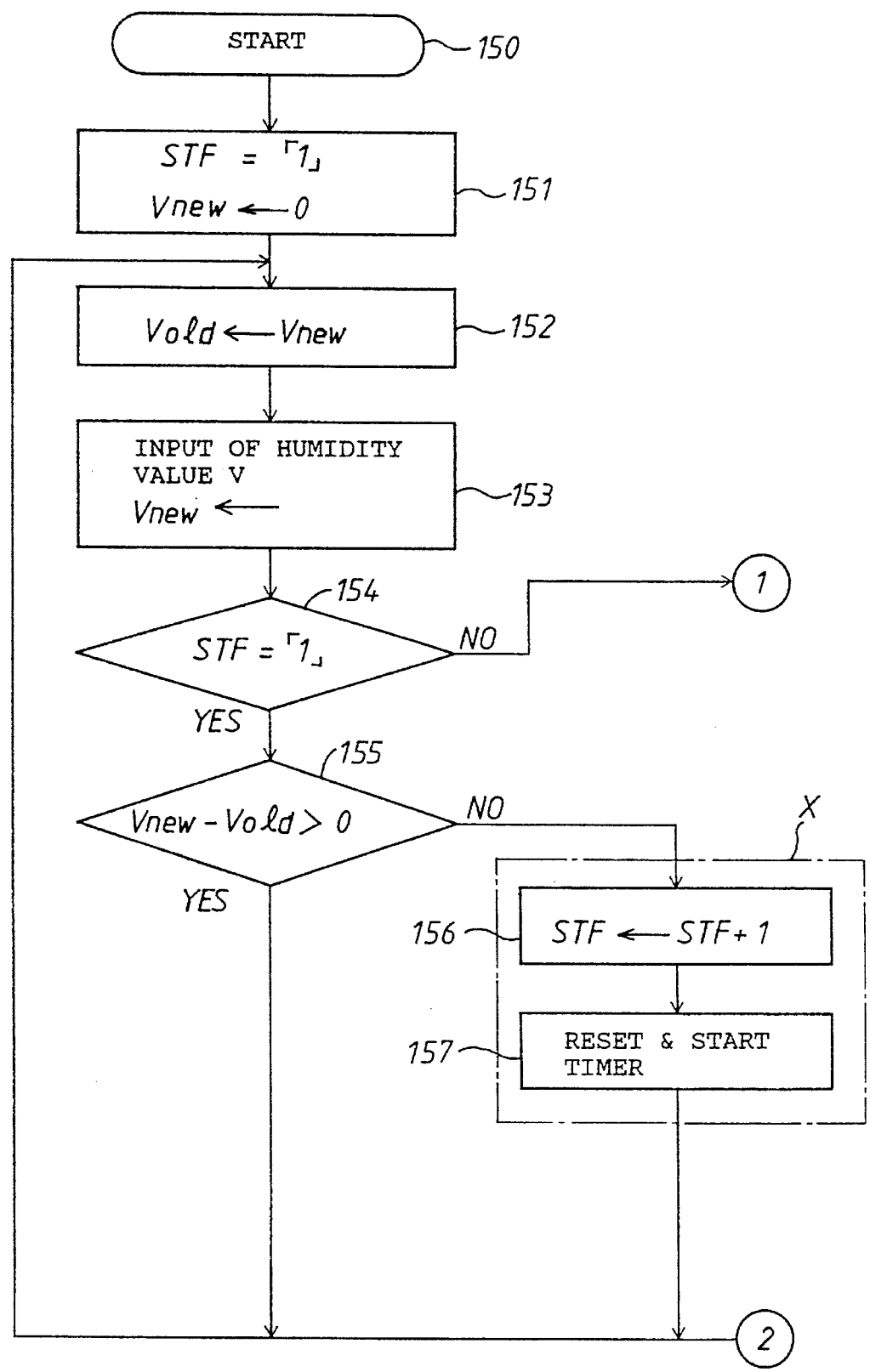
FIGS. 10 and 11 are a flow chart indicative of operation of CPU of a microcomputer shown in FIG. 9.
Figure 11:
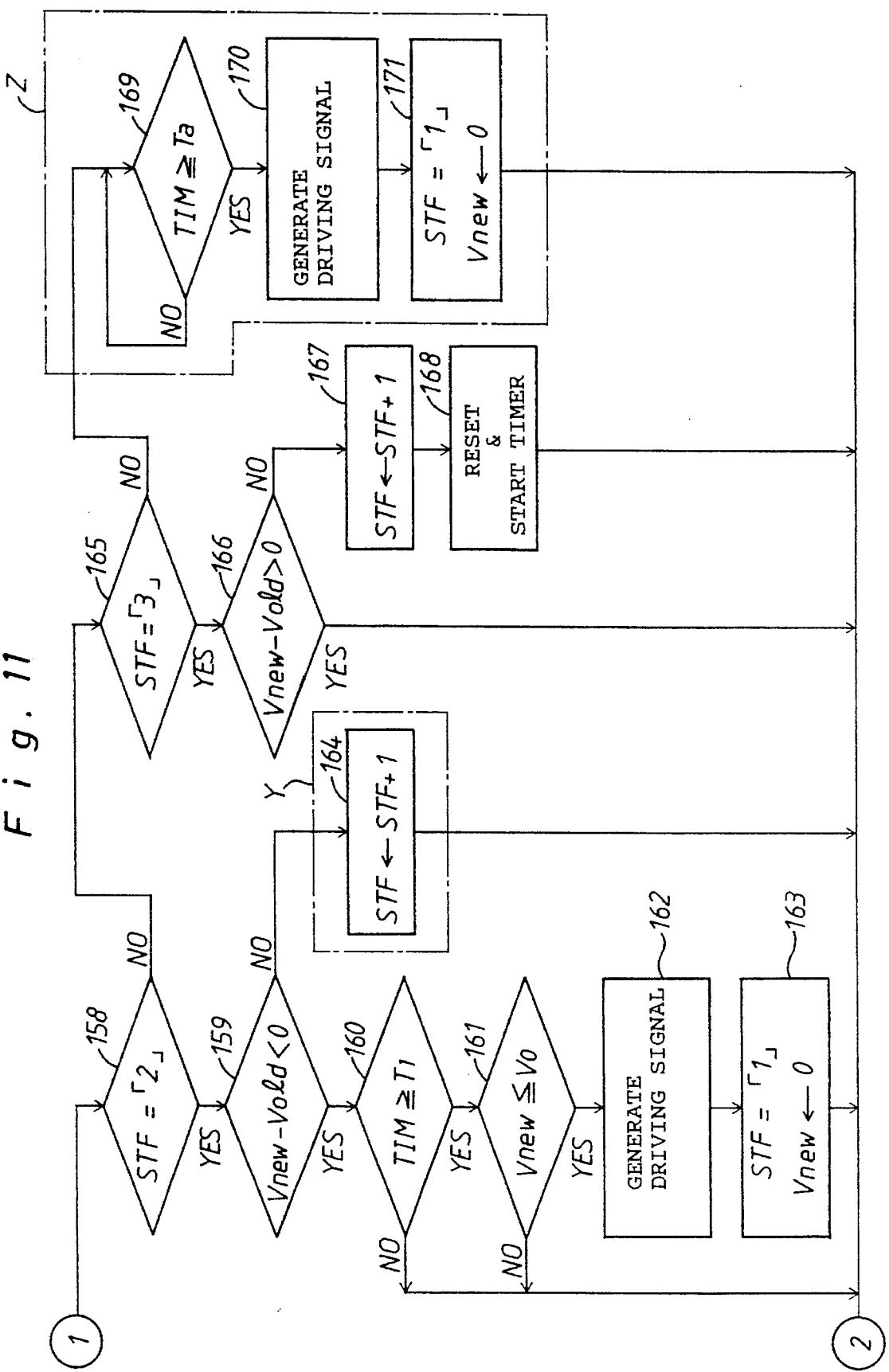

FIGS. 9–11 illustrates a fourth preferred embodiment in accordance with the present invention in which the humidity detector 51, voltage detector 52, trailing edge detector 53, one-shot timer 54 and warning circuit 55 are replaced with an A-D converter 131, a microcomputer 130, a control circuit 132 and a warning circuit 133 shown in FIG. 9.

The A-D converter 131 converts the humidity value V into a digital value. The microcomputer 130 has a CPU 130b, a ROM 130c, a RAM 130d, a timer 130e and an I/O interface 130f which are connected with each other by way of a bus line 130a. The ROM 130c stores therein a program corresponding to the flow chart shown in FIGS. 10 and 11. The CPU 130b starts execution of the program upon the actuation of the power switch. The RAM 130d stores temporarily data necessary for execution of the program. The timer 130e is reset by the CPU 130b repetitively to start measurement of time. The control circuit 132 is controlled by the microcomputer 130, as described later, to drive the warning circuit 133. The warning circuit 133 warns frying completion of the frying materials 17 to the cook.

Incidentally, a time duration between the second peak defined by the point E of FIG. 4 and the predetermined value Vo defined by the point F of FIG. 4 is maintained substantially a constant in any kind of the frying materials described in the first embodiment. Thus, by using the time duration for detection of frying completion of the frying materials, it is possible to accurately detect frying completion of the frying materials. Furthermore, another time duration between the first peak or minimum amount defined by the point C or D of FIG. 4 and the predetermined value Vo is maintained substantially a constant in any kind of the frying materials described in the first embodiment. Thus, another time duration may be utilized for detecting frying completion of the frying materials. As a result, in the fourth embodiment, the above-mentioned flow chart is constructed on a basis of these time durations in addition to the frying phenomena described in the first embodiment. Other construction is the same as that of the first embodiment.

In operation, when the power switch is actuated, the cooking oil 16 is maintained in the predetermined temperature, the humidity detector 40 is conditioned on the humidity-detectable state and each electric element of the above electric circuit is supplied with the electric power. At this stage, execution of the program has been started by the CPU 130b at a step 150 of FIG. 10. Thus, at a step 151a, a state flag STF is initially set into "1", and a new humidity value Vnew is set into "0".

In this case, the state flag STF defines change of an amount of vapor between the timing at throw of the frying materials 17 into the oil tank 11 and the timing at frying completion of the frying materials. STF=1 indicates a first state I defining change between the point at throw of the frying materials into the oil tank 11 and the point at the first peak (see FIG. 4). STF=2 indicates a second state II defining change between the point at the first peak and the point at the minimum amount of vapor. STF=3 indicates a third state III defining change between the point at the minimum amount and the point at the second peak. STF=4 indicates a fourth state IV defining change between the point at the second peak and the point at frying completion of the frying materials. The new humidity value Vnew indicates the actual humidity value detected by the humidity detector 40, and an old humidity value Vold indicates a preceding humidity value which has already been detected by the humidity detector 40.

When the old humidity value Vold is updated by the new humidity value Vnew at a step 152, the actual humidity value detected by the humidity detector 40 is applied at a step 153 to the microcomputer 130 through the A-D converter 131 to be set into the new humidity value Vnew. Thus, the new humidity value Vnew represents the actual humidity value detected by the humidity detector 40, and the old humidity value Vold represents the preceding humidity value detected by the humidity detector 40.

After the above-mentioned execution, the program proceeds to a step 154 for determining as to whether or not the state flag STF is "1". Because the state flag STF is initialized at step 151 to be equal to "1", an amount of vapor is maintained in the first state I. Thus, an answer is determined "YES" at step 154. When the cook throws the frying materials 17 into the oil tank 11 at this stage (see the point A of FIG. 4), moisture in the frying materials 17 is permeated into the high temperature cooking oil 16 and then heated thereby. Thus, the moisture is instantaneously vaporized to rise as a large amount of vapor toward the oil surface (see the points A to C of FIG. 4).

When the program proceeds to a step 155, it is determined whether or not (Vnew−Vold)>0 is satisfied or whether or not the first peak has been detected by the humidity detector 40. At this stage, an amount of vapor from the frying materials is maintained in the first state I. Thus,(Vnew−Vold)>0 is satisfied. As a result, the answer is determined "YES" at step 155 to return the program to the step 152 and also to repeat execution of steps 152 to 155.

When an amount of the vapor is maintained in the second state II on a basis of dissatisfaction of (Vnew−Vold)>0, the answer at step 155 becomes "NO" and the program proceeds to a step 156. Then, the state flag STF is incremented by "1" to be updated into STF=2, and the timer 130e is then reset and started at a step 157 to measure a time. In the embodiment, as described later, the reset processing of the timer 130e is utilized for frying materials of the kind defined by FIG. 5. In the second state II, the surface of the frying materials 17 is gradually hardened by heat energy from the heater 12 after the vapor amount reaches the first peak (see the point C of FIG. 4). Thus, release of moisture from the frying materials 17 is maintained, but in difficult condition to decrease an amount of the vapor rising from the oil surface.

When the program returns to the step 152 from the step 157, execution at the steps 152,153 is again performed, and an answer is determined at step 154 as to whether or not STF=1. Because of STF=2 at this stage, the answer is determined "NO" at step 154, and the program proceeds to a step 158 at which an answer is determined "YES". When the program proceeds to a step 159 for determining as to whether or not (Vnew−Vold)<0. In other words, at step 159, determined is whether or not the minimum amount of the vapor is detected by the humidity detector 40. When the answer at step 159 is decided "YES" in case the humidity value does not yet decrease down to the minimum value, the program proceeds to a step 160. When the answer at step 159 is determined "NO", the program proceeds to a step 164.

When the program proceeds to step 160, as previously described, it is determined whether or not a measured time of the timer 130e, which has already reset and started, has lapsed by a predetermined time T1 stored in the ROM 130c previously. The predetermined time T1 represents a time which is longer than a time interval from the first peak to the minimum amount of vapor and is shorter than a time until frying completion of the frying materials. In general frying materials, an amount of vapor which rises from the oil surface reaches the first peak, decreases down to the minimum amount before lapse of the predetermined time T1, and then starts to increase. Thus, the answer at step 160 is determined "NO" to return the program to step 152. Thereafter, execution at steps 152,153 is repeated, as previously described. Then, a "NO" answer is done at step 154, and a "YES" answer is done at step 158 to advance the program to the step 159. In addition, described is later regarding the frying materials of the kind defined by FIG. 5.

When an amount of vapor rising from the oil surface decreases down to the minimum amount, the answer at step 159 becomes "NO" and the program proceeds to step 164 at which the state flag STF is incremented by "1" and set into STF=3 defining the third state III. In this state, an amount of vapor rising from the frying materials 17 decreases once to the minimum amount defined by the point D of FIG. 4. When temperature in the interiors of the frying materials rises gradually under continuous heat by the heater 12, moisture in the frying materials starts to be vaporized. Thus, vapor is released from the frying materials to decrease weight of the frying materials. As a result, the frying materials come to the oil surface.

When execution at steps 152, 153 is performed after return of the program to step 152, whether or not STF=1 is determined at step 154. Because of STF=3 at this stage, the "NO" answer is done, and the program proceeds to the step 158 at which an answer is determined "NO." When an answer is determined "YES" at step 165, the program proceeds to a step 166 for determining whether or not (Vnew−Vold)>0 is satisfied. This means that whether or not the second peak is detected by the humidity detector 40 is determined. When (Vnew−Vold)>0 is satisfied at this stage, an "YES" answer is given to return the program to the step 152.

When an amount of vapor rising from the oil surface is maintained in the fourth state IV after the humidity detector 40 has detected the second peak, an answer is determined "NO" to advance the program to a step 167. Then, the state flag STF is incremented by "1" and set into STF= 4. Subsequently, at a step 168 the timer 130e is reset and started to measure a time. In the fourth state IV, the frying materials 17 float on the oil surface to easily release moisture thereof outward, and an amount of vapor rising from the oil surface decreases from the second peak (see the point E of FIG. 4) to an amount defined by the point F.

When execution at steps 152,153 is again performed after return of the program to step 152, a "NO" answer is given at steps 154, 158 and 165 in sequence on a basis of STF=4, and the program proceeds to a step 169 for determining whether or not the timer 130e restarted already at step 168 has ended measurement of a predetermined time Ta. When measurement of the predetermined time Ta has been ended, an answer is determined "YES" at step 169, and the program proceeds to a step 170. In this case, the predetermined time Ta indicates a lapsing time between a detection timing of the second peak and a finish timing in frying the frying materials 17 and is stored in the ROM 130c.

When the program proceeds to step 170, as previously described, a driving signal is generated from the CPU 130b through the I/O interface 130f to the control circuit 132. Thus, the warning circuit 133 is controlled by the control circuit 132 to warn frying completion of the frying materials 17 to the cook. As a result, the frying materials 17 may be taken out by the cook from the oil tank 11 as optimally cooked frying materials. After generation of the driving signal at step 170, the program proceeds to a step 171 in which the state flag STF is set into "1" and the new humidity value Vnew is reset into "0".

As understood from the above description, when an amount of vapor rising from the frying materials 17 in the oil tank 11 is detected by the humidity detector 40 as a humidity value, the detected humidity value is digitally converted by the A-D converter 131 and applied to the microcomputer 130. When the converted humidity value reaches the second peak during chase of the converted humidity value in the microcomputer 130, the predetermined time Ta is measured by the timer 130e to produce a driving signal upon completion in measurement of the predetermined time Ta. Thus, the warning circuit 133 is controlled by the control circuit 132 to warn the timing at frying completion of the frying materials to the cook. As a result, the cook may easily and accurately recognize the finish timing in frying the frying materials without any influence caused by the type and amount of the frying materials placed into the oil tank 11.

Hereinafter, explained is frying phenomena regarding the frying materials of the kind defined by the characteristic curve of FIG. 5. In this case, the timer 130e ends measurement of a predetermined time T1 before the digital humidity value reaches the second peak after restart of the timer 130e at step 157 caused by the "YES" answer at step 155. Thus, an "YES" answer is given at step 160 to advance the program to a step 161 for determining whether or not the humidity value Vnew reaches the predetermined value Vo (Vnew Vo). When the humidity value Vnew reaches the predetermined value Vo, an answer is determined "YES" at step 161, and a driving signal is generated at a step 162 to drive the warning circuit 133 through the control circuit 132. Thus, the cook may be warned of frying completion of the frying materials by the the warning circuit 133. As a result, overcooking may be prevented to overcook the frying materials of the kind defined by FIG. 5, even if the humidity detector 40 may not detect the second peak. After generation of the driving signal, the program proceeds to a step 163 at which the state flag STF is set into "1" and the new humidity value Vnew is reset into "0".

FIG. 12 illustrates a fifth preferred embodiment in accordance with the present invention in which an X-marked portion surrounded by a dot and line in the flow chart of FIG. 10 is modified as shown in FIG. 12. Other construction is the same as that of the fourth embodiment.

In operation, when the answer is determined "NO" at step 155, as previously described, the program proceeds to step 156 at which the state flag STF is incremented by "1" and set into STF=2 at step 156 (see FIGS. 10 and 12). Then, the timer 130e is reset and started at step 157 to start of its measurement. When the program proceeds to a step 157a (see FIG. 12) for determining whether or not the timer 130e restarted at step 157 ends measurement of a predetermined time Tb. If measurement of the predetermined time Tb is ended, an answer is determined "YES" at step 157a to advance the program to a step 157b (see FIG. 12). In the embodiment, the predetermined time Tb indicates a lapsing time from the detection timing of the first peak by the humidity detector 40 until the finish timing at frying the frying materials and is stored previously in the ROM 130c.

When a driving signal is generated at step 157b, the control circuit 132 controls the warning circuit 133 which warns the cook of frying completion of the frying materials. Thus, the frying materials 17 may be taken out by the cook from the oil tank 11 as optimally cooked frying materials. After generation of the driving signal at step 157b, as previously described, the program proceeds to a step 157c for initialization of the next execution.

As understood from the above description, the timer 130e measures the predetermined time Tb after detection of the first peak by the humidity detector 40. When measurement of the predetermined time Tb is ended, the warning circuit 133 is driven to warn frying completion of the frying materials to the cook. Thus, the cook may easily and accurately recognize the finish timing in frying the frying materials without any influence or difficulty caused by the type and amount of the frying materials placed into the oil tank 11.

FIG. 13 illustrates a sixth preferred embodiment in accordance with the present invention in which a Y-marked portion surrounded by a dot and line in the flow chart of FIG. 11 is modified as shown in FIG. 13. Other construction is the same as that of the fourth embodiment.

In operation, when the program proceeds to step 164 after decision of the "NO" answer at step 159, as previously described, the state flag STF is incremented by "1" and set into STF=3. Then, the timer 130e is reset and started at a step 164a of FIG. 13 to measure a time. When the program proceeds to a step 164b for determining whether or not the timer 130e restarted at step 164a has ended measurement of a predetermined time Tc. If measurement of the predetermined time Tc is ended, an answer is determined "YES" at step 164b to advance the program to a step 164c. In the embodiment, the predetermined time Tc indicates a lapsing time after detection of the minimum humidity value by the humidity detector 40 until frying completion of the frying materials and is stored previously in the ROM 130c.

When a driving signal is generated at step 164c, the control circuit 132 controls the warning circuit 133 which warns the cook of frying completion of the frying materials. Thus, the frying materials 17 may be taken out by the cook from the oil tank 11 as properly cooked frying materials, as previously described. After generation of the driving signal at step 164c, the program proceeds to a step 164d for initialization of the next execution, as previously described.

As understood from the above description, the timer 130e measures the predetermined time Tc after detection of the minimum value by the humidity detector 40. When measurement of the predetermined time Tc is ended, the warning circuit 133 is driven to warn the cook of frying completion of the frying materials. Thus, the cook may simply recognize accurately the finish timing in frying the frying materials without any influences of the kind and amount of the frying materials placed into the oil tank 11, as described in the fourth embodiment.

FIG. 14 illustrates a seventh preferred embodiment in accordance with the present invention, in which a Z-marked portion surrounded by a dot and line in the flow chart of FIG. 11 is modified as shown in FIG. 14. Other construction is the same as that of the fourth embodiment.

In operation, when the "NO" answer is given at step 166 after reach of the humidity value to the second peak, as previously described, the program proceeds to step 167 at which the state flag STF is incremented by "1" and is set into STF=4. Then, at step 168 the timer 130e is reset and started. Additionally, measurement of the timer 130e has no relation to this embodiment.

When the "NO" answer is given at each of steps 154,158 and 165 after execution at steps 152,153, the program proceeds to a step 169a of FIG. 14 for determining whether or not the new humidity value Vnew has reached a predetermined value Vo. If an answer is determined "YES" at step 169a, a driving signal is generated at step 170 to control the warning circuit 133 by way of the control circuit 132. Thus, the warning circuit 133 warns the cook of frying completion of the frying materials. After generation of the driving signal at step 170, the program proceeds to step 171 for initialization of the next execution, as previously described.

As understood from the above description, when the humidity value has reached the predetermined value Vo after detection of the second peak by the humidity detector 40, the warning circuit 133 warns of completion of the frying of the frying materials the cook. Thus, the cook can easily and accurately recognize the finish timing in frying the frying materials without any influence on accuracy due to the type and amount of the frying materials placed into the oil tank 11, as described in the fourth embodiment.

Figure 15A:
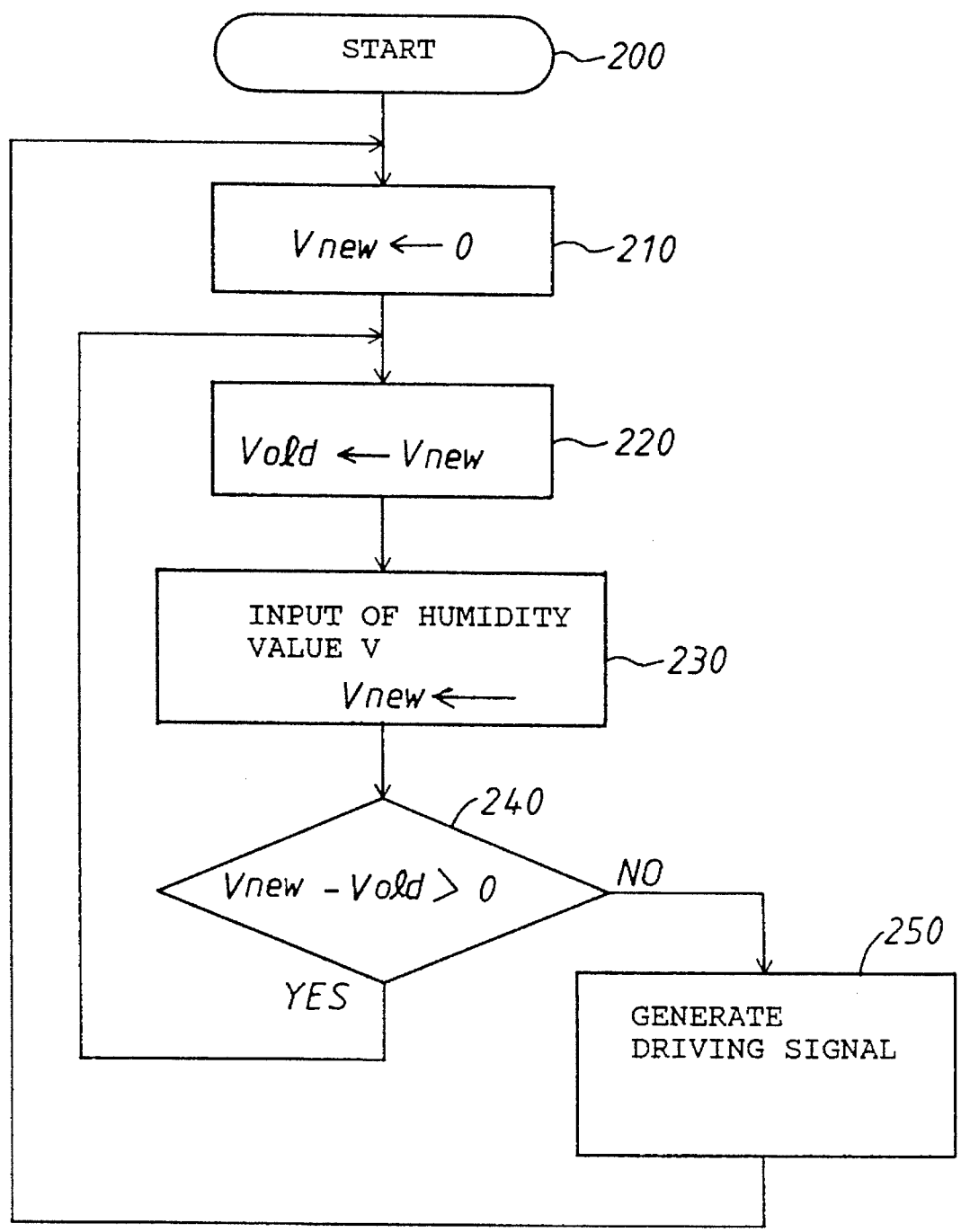
FIG. 15A is a flow chart of an eighth preferred embodiment in accordance with the present invention.

FIG. 15A illustrates an eighth preferred embodiment in which a program defined by a flow chart shown in FIG. 15A is adopted in replacement of the program defined by the flow chart of FIGS. 10 and 11 and stored in the ROM 130c.

In frying phenomena of the frying materials described in the previous embodiments, pork cutlets, croquettes and fried meats correspond to frying materials of the kind defined by the characteristic curve in FIG. 4, and meat balls correspond to frying materials of the kind defined by the characteristic curve in FIG. 5. However, there are other kinds of frying materials of which interior portions need not to be heated. In such frying materials as, for example, spring rolls of which interior portions are formed with cooked bamboo shoots, bean-stalks or the like, an amount of vapor rising from the frying materials takes a peak when the outer coating or surface of the frying materials have been fried. This means that frying completion of the frying materials should be defined by frying completion of the outer coating of the frying materials, because the process shown in FIG. 4 or 5 would cause these frying materials to overfry. Thus, the flow chart of FIG. 15A is given, which is directed to the above-mentioned frying phenomena of frying materials such as spring rolls or the like in this embodiment. Other construction is the same as that of the fourth embodiment.

In operation, when the power switch is actuated, the oil 16 in the oil tank 11 is maintained in the setting temperature, and the humidity detector 40 is conditioned in the humidity-detectable state. Furthermore, each electric element of the above-mentioned electric circuit is supplied with the electric power upon actuation of the power switch. At this stage, execution of the program is started at a step 200 of FIG. 15A to initially set the new humidity value Vnew into "0" at a step 210.

When the old humidity value Vold is updated by the new humidity value Vnew at step 220, the actual humidity value detected by the humidity detector 40 is digitally converted by the A-D converter 131 and is applied to the microcomputer 130. Then, the digital humidity value is set into the new humidity value Vnew at a step 230. Thus, the new humidity value Vnew indicates the actual humidity value detected by the humidity detector 40, and the old humidity value Vold indicates the preceding humidity value detected by the humidity detector 40 preceding.

When the cook throws into the oil tank 11 the frying materials such as the spring rolls of which interior portions need not to be heated, moisture in the frying materials permeates into the high-temperature oil 16. Thus, the permeating moisture is instantaneously heated by the high-temperature oil 16 to vapor and to rise toward the oil surface.

When the program proceeds to a step 240, determined is whether or not (Vnew−Vold)>0 is satisfied. This means that whether or not the humidity detector 40 has detected the peak of an amount of vapor is determined. At this stage, (Vnew−Vold)>0 is satisfied, because an amount of vapor rising from the frying materials is increasing. Thus, an answer is determined "YES" at step 240 to return the program to step 220. When (Vnew−Vold)>0 is dissatisfied upon reach of the latest humidity value Vnew to the peak at step 230, an answer is determined "NO" at step 240 to advance the program to a step 250. Then, a driving signal is generated at step 250 to drive the warning circuit 133 by way of the control circuit. Thus, the warning circuit 133 warns the cook of frying completion of the frying materials such as the spring rolls.

As described in detail, in case of the frying materials of which the interior portions need not to be heated like the spring rolls, the "YES" answer is given at step 240 upon reach of an amount of vapor rising from the frying materials to the peak. Then, the cook is warned of frying completion of the frying materials immediately by the warning circuit 133. This means that frying in the entirety of the frying materials of which the interior portions need not to be heated may be defined by frying completion of only the coating of the frying materials. As a result, the frying materials may be taken out from the oil tank 11 without becoming overfried.

Figure 15C:
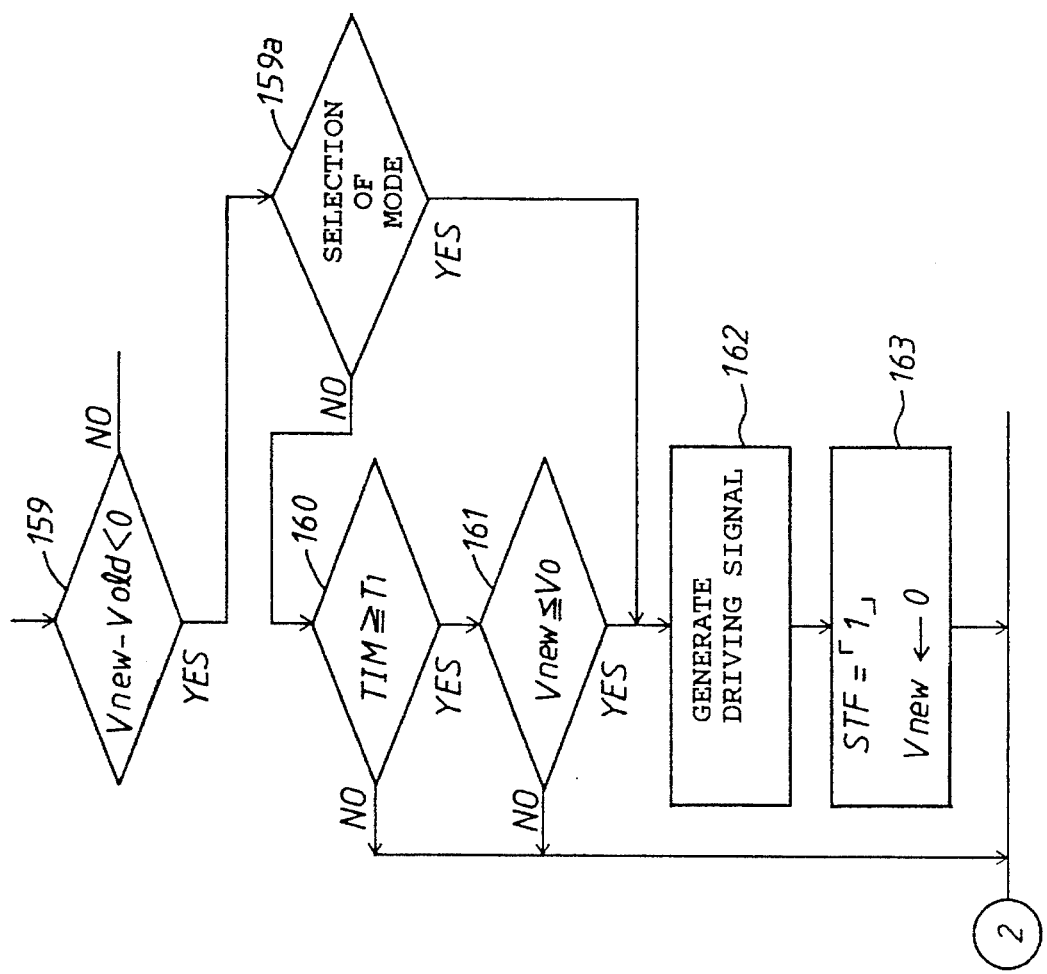
FIG. 15C is a partial flow chart indicating operation of the CPU of the microcomputer shown in FIG. 15B.
Figure 15B:
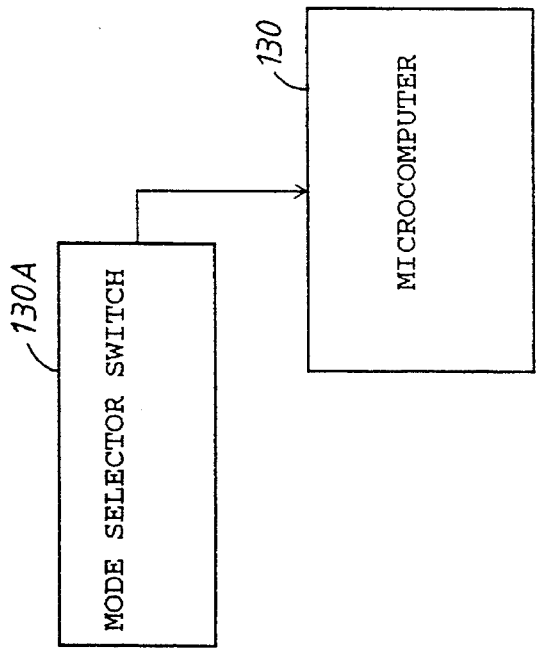
FIG. 15B is a partial circuit diagram of a ninth preferred embodiment in accordance with the present invention.

FIGS. 15B and 15C illustrate a ninth preferred embodiment in accordance with the present invention, which is characterized in that a mode selector switch 130A is, as shown in FIG. 15B, additionally connected to the microcomputer 130 in the electric circuit shown in FIG. 9 and in that the flow chart of FIG. 11 is modified partly as shown in FIG. 15C. In the embodiment, the modified flow chart is given, additionally taking account of frying the frying materials of which the interior portions need not to be heated like the spring rolls, as described in the eighth embodiment. The mode selector switch 130A is actuated to produce a mode selection signal when selects a frying mode for the frying materials of which the interior portions needs not to be heated. Other construction is the same as that of the fourth embodiment.

In operation, when the program proceeds to step 159 of FIGS. 11 and 15C, as previously described in the fourth embodiment, whether or not (Vnew−Vold)<0 is satisfied is determined. When (Vnew−Vold)<0 is satisfied after the peak in an amount of vapor rising from the oil surface has been detected by the humidity detector 40, an answer is determined "YES" at step 159 to advance the program to a step 159a of FIG. 15C.

When the mode selector switch 130A is generating a mode selection signal at this stage, an answer is determined "YES" at step 159a. This means that a mode for frying the frying materials of which interior portions need not to be heated is selected. Then, a driving signal is generated at step 162 to drive the warning circuit 133 by way of the control circuit 132. Thus, the cook is warned by the warning circuit 133 of frying completion of the frying materials of which interior portions need not to be heated such as the spring rolls. If a mode selection signal is not inversely generated from the mode selector switch 130A at this stage, an answer is determined "NO" at step 159a. Thus, the program advances to step 160 and thereafter to perform execution necessary for warning frying completion of the frying materials such as pork cutlets, croquettes, fried meats, meat balls and the like, as previously described in the fourth embodiment.

As understood from the above description, the kinds of the frying materials are selected in relation to a mode selection signal from the mode selector switch 130A. If the mode selection signal is generated from the mode selector switch 130A, selected is a mode for frying the frying materials of which interior portions need not to be heated like the spring rolls. Then, an answer is determined "YES" at steps 159,159a in sequence when an amount of vapor rising from the frying materials has reached the peak. Subsequently, the warning circuit 133 cooperates with the control circuit 132 in response to the "YES" answer at step 159a to immediately warn the cook of frying completion of the frying materials of which interiors need not to be heated. This means that frying completion of the frying materials of which interiors need not to be heated like the spring rolls may be defined by frying completion of only the outer coating of the frying materials. As a result, the frying materials of which interiors need not to be heated may be taken out by the cook from the oil tank 11 in an optimum condition.

If the mode selection signal is not generated from the mode selector switch 130A, a mode is selected for frying the frying materials such as pork cutlets, croquettes, fried meats, meat balls and the like. Then, an answer is determined "NO" at step 159a. Thus, the program is advanced to step 160 and thereafter to perform execution necessary for warning frying completion of the frying materials such as pork cutlets, croquettes, fried meats, meat balls and the like, as previously described in the fourth embodiment. In this case, it is possible to ensure proper frying completion of the frying materials of the different kinds with the single fryer in relation to the mode selector switch 130A.

Hereinafter, a tenth preferred embodiment in accordance with the present invention is explained with reference to FIGS. 16 to 18. The detecting portion 40a of the humidity detector 40 described in the first embodiment is secured by way of a U-shaped protecting cover member 112 to an upper inner surface portion of the rear wall 10a of the fryer body 10 upon a rear portion of the oil tank 11 within a rising area of vapor from the oil surface, as shown in FIGS. 16 and 17.

Figure 16:
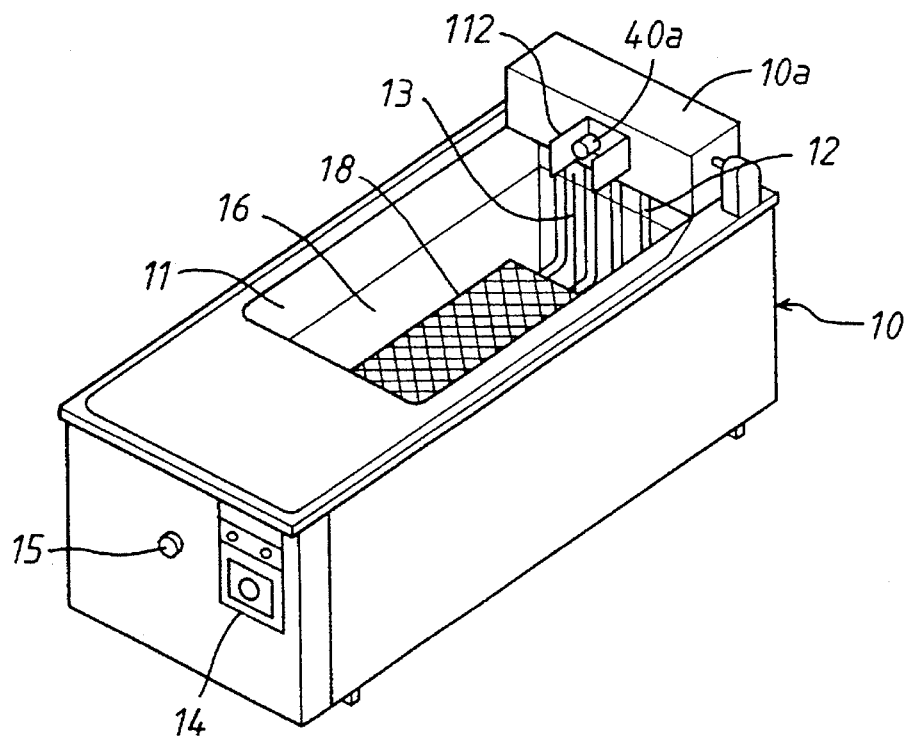
FIG. 16 is a perspective view of a tenth preferred embodiment of a fryer body in accordance with the present invention.
Figure 17:
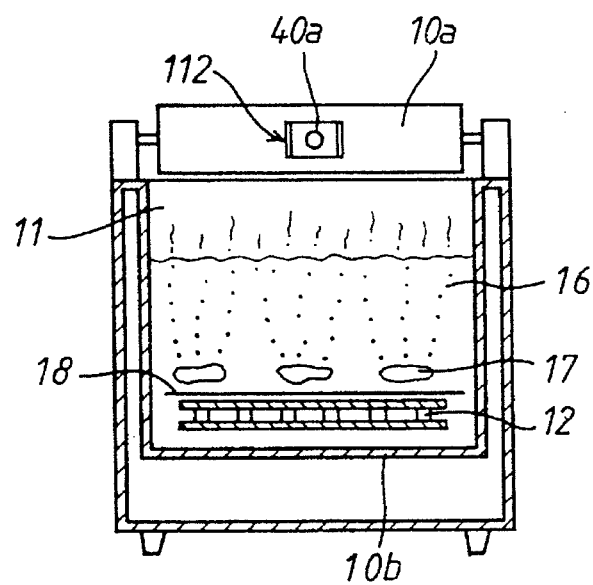
FIG. 17 illustrates a cross section of the same fryer body.
Figure 18:
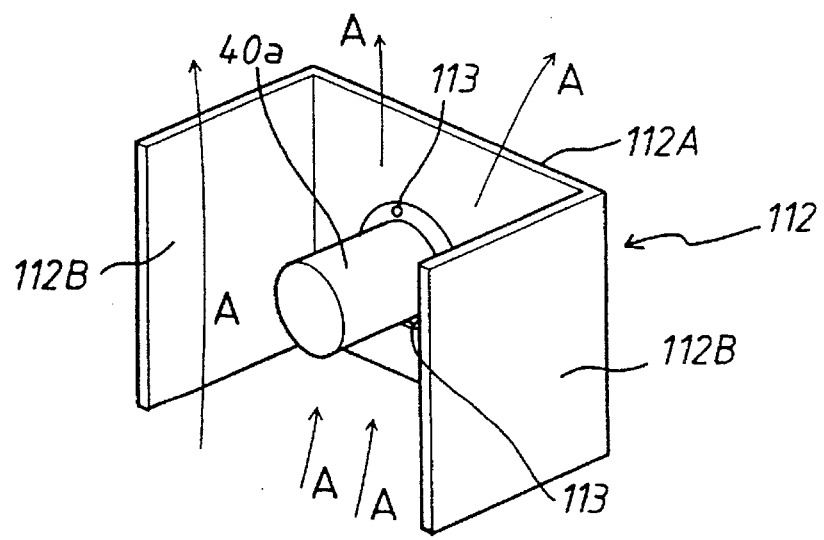
FIG. 18 is a enlarged perspective view of a detecting portion and a protecting cover member shown in FIGS. 16 and 17.

As shown in FIGS. 16 to 18, the protecting cover member 112 has a base plate portion 112A which is inserted at its central hole portion relatively into the detecting portion 40a and is fixed on the upper inner surface portion of the rear wall 10a of the fryer body 10 by screws 113, 113. Side plate portions 112B, 112B of the protecting cover member 112 are positioned vertically to an upper opening surface of the oil tank 11 and oppositely by way of the detecting portion 40a. Other construction is the same as that of the first embodiment.

With this construction, the detecting portion 40a of the humidity detector 40 may be isolated and protected by both the side plate portions 112B, 112B of the protecting cover member 112 from air flows which will move toward the detecting portion 40 perpendicularly to the side plate portions 112B, 112B from outward respectively. Thus, the detecting portion 40a may be surely isolated and protected by the side plate portions 112B, 112B from the from an air flow which will be caused by workers moving near the fryer, air conditioners or the like to flow toward the side wall of the fryer. Furthermore, an air flow including vapor rising from the oil surface during frying of the frying materials may be guided by both the side plate portions 112B, 112B toward the detecting portion 40a, as shown by an arrow mark A of FIG. 18. Thus, precision in detection of the detecting portion 40a of the humidity detector 40 may be enhanced. Other operation and effect are the same as those of the first embodiment.

Figure 19:
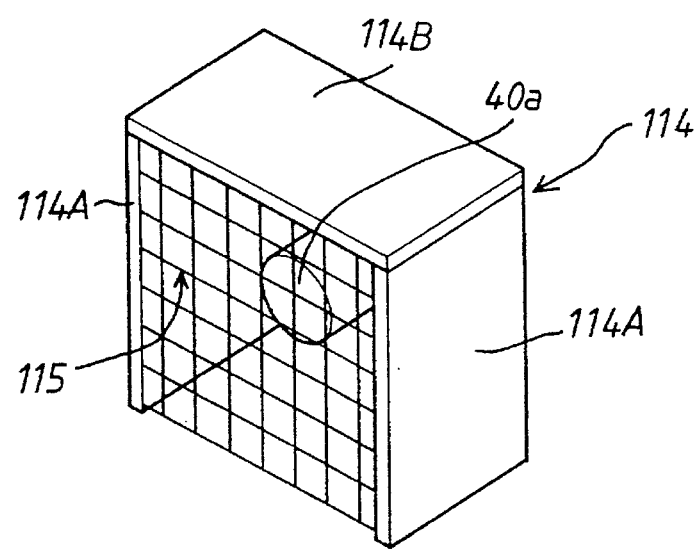
FIG. 19 is a perspective view of a modification of the protecting cover member shown in FIG. 18.
Figure 20:
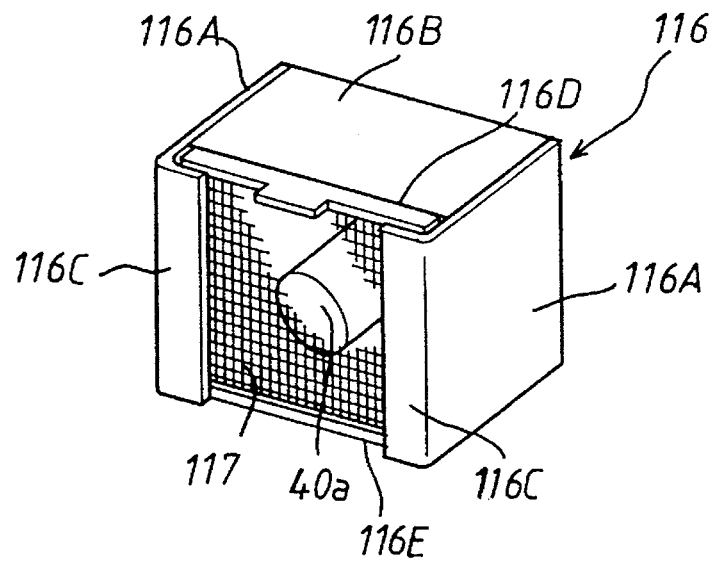
FIG. 20 is a perspective view of another modification of the protecting cover member shown in FIG. 18.
Figure 21:
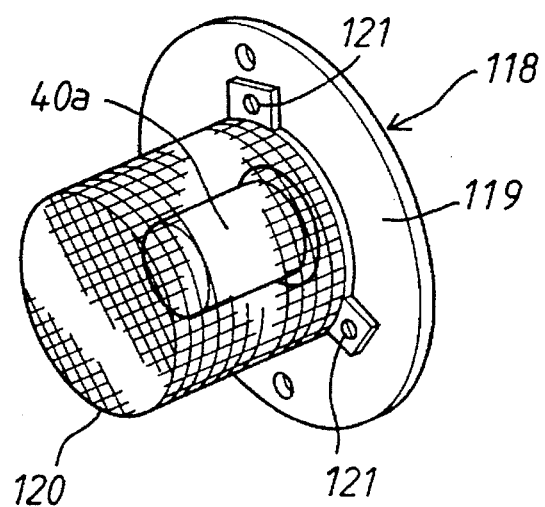
FIG. 21 is a perspective view of still another modification of the protecting cover member shown in FIG. 18.

Although in the tenth embodiment the protecting cover member 112 is additionally adopted to protect the detecting portion 40a, the protecting cover member 112 may be replaced with a protecting cover member 114, 116 or 118, as shown in FIG. 19, 20 or 21.

The protecting cover member 114 shown in FIG. 19 has side and upper plate portions 114A, 114A and 114B by which the detecting portion 40a is surrounded at its left, right and upper sides. The protecting cover member 114 is opened at its lower opening portion toward the oil surface in the oil tank 11. On the front surface of the cover member 114, a protecting mesh 115 is provided to protect the detecting portion 40a. Thus, the detecting portion 40a may be isolated and protected by the side plate portions 114A, 114A from an air flow which will be caused by workers moving near the fryer, air conditioners or the like to flow toward the side wall of the fryer. The detecting portion 40a may be also isolated and protected by the upper plate portion 114B from an air flow which will be exhausted toward the upper plate portion 114B from an exhaust duct located upon the upper plate portion 114B.

Furthermore, an air flow including vapor rising from the frying materials in the frying process of the frying materials is moved into the lower opening portion of the protecting cover member 114 and is remained in the same cover member 114. Thus, the humidity detector 40 may precisely detect an amount of vapor from the frying materials at the detecting portion 40a. In this case, even if the cook uses chopsticks when he places the frying materials into the oil tank 11 or takes out the frying materials from the oil tank 11, the detecting portion 40a may be surely protected by the protecting mesh 115 and prevented from being directly hit with the chopsticks.

The protecting cover member 116 shown in FIG. 20 has side, upper and lower plate portions ]16A, 116A, 116B and 116E by which the detecting portion 40a is surrounded at its left, right, upper and lower sides. On the front surface of the cover member 116, an oil filter 117 is detachably supported by flanged portions 116C, 116C of the side plate portions 116A, 116A. the oil filter 117 is formed with a ceramics plate composed of alumina, glass fiber or filter paper or the like. In this case, each aperture of the oil filter 117 has a diameter of a few microns to a few hundred microns, which is smaller than a diameter of a grain of oil mist and larger than a diameter of a grain of vapor.

With this construction, the detecting portion 40a may be isolated and protected by the side plate portions 116A, 116A of the protecting cover member 116 from an air flow which will be caused toward the side wall of the fryer, as previously described. The detecting portion 40a may be also isolated and protected by the upper plate portion 116B from an air flow which will be exhausted toward the upper plate portion 116B from an exhaust duct or the like located upon the upper plate portion 116B.

Furthermore, an air flow including vapor rising from the frying materials in frying process of the frying materials is moved through the oil filter 117 into the protecting cover member 116 and is remained in the same cover member 116. In this instance, oil mist rising from the surface of the high-temperature oil 16 may be surely prevented from flowing into the cover member 116 by the oil filter 117. Thus, the humidity detector 40 may precisely detect an amount of vapor from the frying materials at the detecting portion 40a and properly maintain long its detecting function without any adhesion of the oil mist and splashed cooking oil to the detecting portion 40a. Maintenance for the oil filter 117 may also be easily performed because of the detachable assembly thereof. Even if the cook uses chopsticks when he places the frying materials into the oil tank 11 or takes out the frying materials from the oil tank 11, the detecting portion 40a may be surely prevented and protected by the oil filter 117 from hitting directly with the chopsticks.

The protecting cover member 118 shown in FIG. 21 has a circular base plate 119 which is secured on the inner upper portion of the rear wall 10a of the fryer body 10. The cover member 118 also has a cylindrical oil filter 120 which is detachably secured by screws 121, 121 to the base plate 119 to coaxially surround the detecting portion 40a therein. In this case, the oil filter 120 is formed with the same materials as that of the above mentioned oil filter 117. Thus, the oil filter 120 performs the same role as that of the oil filter 117 to ensure precise detection by the detecting portion 40a with prevention of oil mist flowing into the cover member 118.

Figure 22:
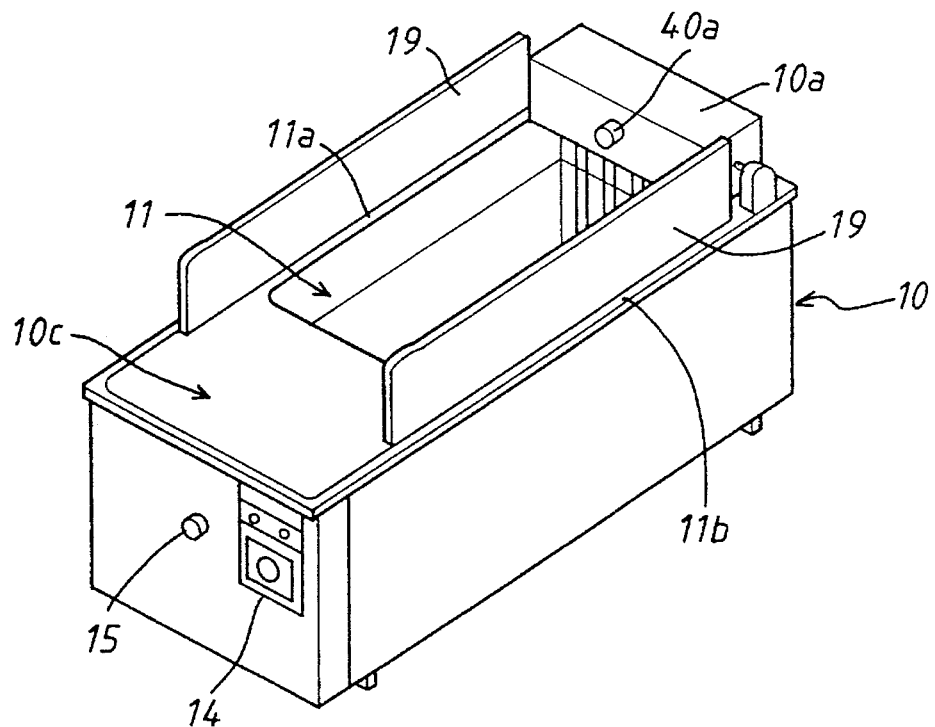
FIG. 22 is a perspective view of an eleventh preferred embodiment of a fryer body according to the present invention.
Figure 23:
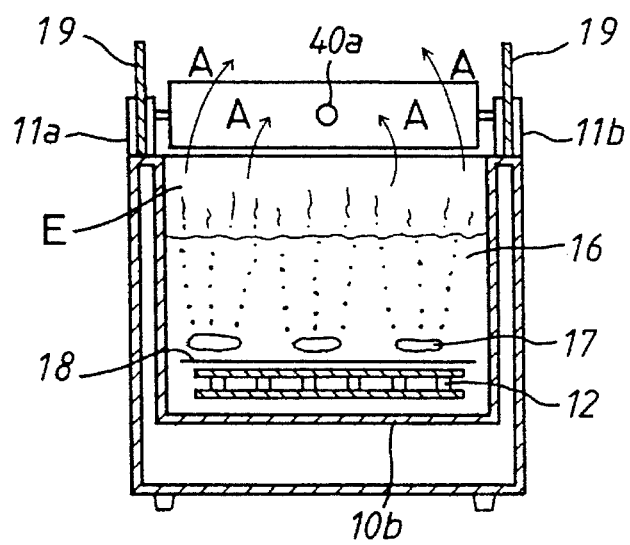
FIG. 23 illustrates a cross section of the same fryer body.

FIGS. 22 and 23 illustrate an eleventh preferred embodiment in accordance with the present invention which is characterized in that a pair of screen plates 19, 19 formed with a metal plate or a plate with heat or oil resisting property are mounted vertically on an upper surface 10c of the fryer body 10. The screen plates 19, 19 are extended along the left and right end portions 11a, 11b from the rear wall 10a of the fryer body 10 to the front end portion of the oil tank 11, as shown in FIGS. 22, 23, to surround the detecting portion 40a therebetween. Each height of the screen plates 19, 19 is selected to be equal to height of the detecting portion 40a on the rear wall 10a or a value higher slightly than the detecting portion 40a to form a large space portion E(see FIG. 23) upon the oil surface. Other aspects of the construction is the same as that of the first embodiment.

With this construction, an air flow including vapor rising from the frying materials is guided smoothly upward by the screen plates 19, 19 and the rear wall 10a only through the space portion E, as shown by an arrow mark A in FIG. 23. In this instance, an air flow from the air conditioner or the like may be prevented by the screen plates 19, 19 and the rear wall 10a from flowing into the space portion E. Thus, even if vapor rising from the frying materials is maintained in an extremely small amount, the humidity detector 40 may surely detect it at its detecting portion 40a. This results in an increase of precision of warning of frying completion of the frying materials. In addition, circumference portions of the fryer body 10 may be maintained clean because the cooking oil is prevented by the screen plates 19, 19 from splashing out. Other operation and effect are the same as those of the first embodiment.

Figure 24:
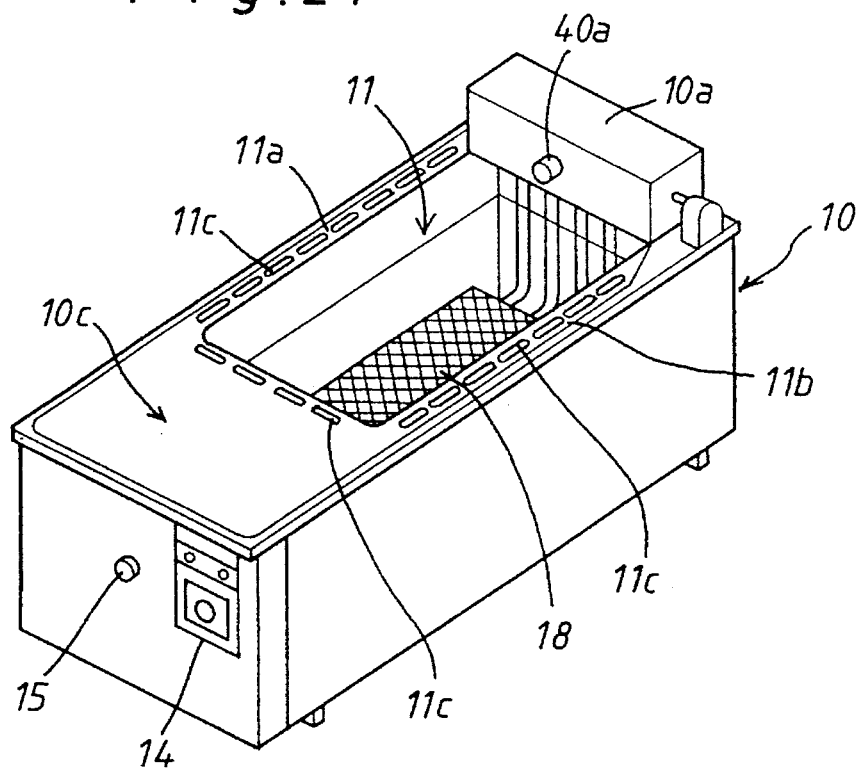
FIG. 24 is a perspective view of a twelfth preferred embodiment of a fryer body according to the present invention.
Figure 25:
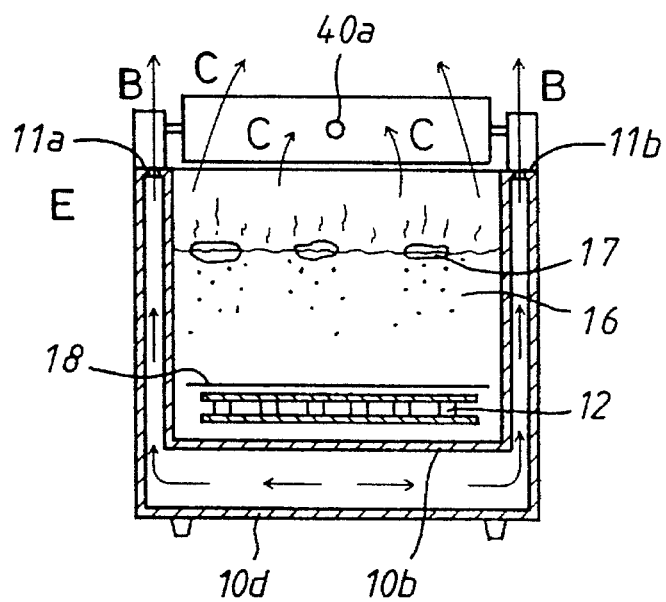
FIG. 25 shows a cross section of the same fryer body.
Figure 26:
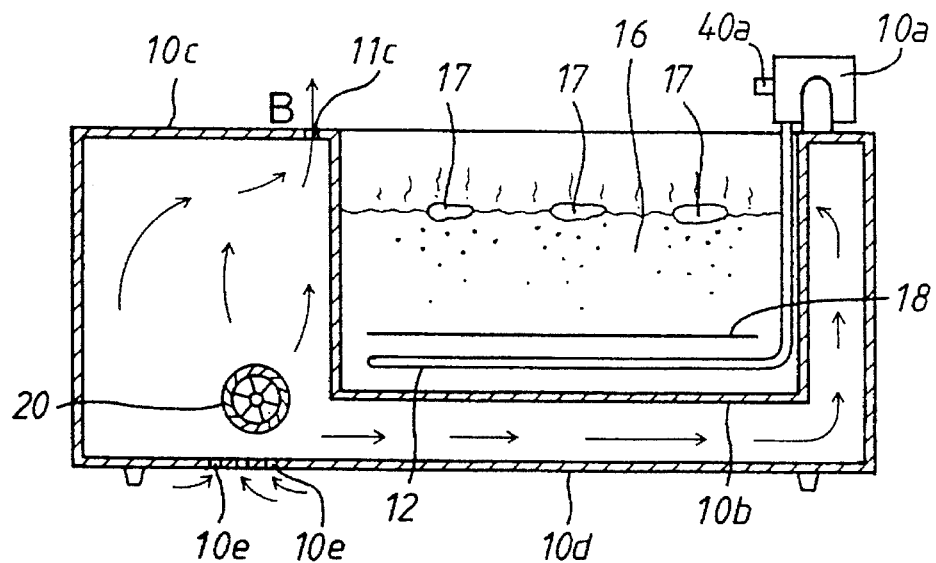
FIG. 26 shows a longitudinal section of the same fryer body.

FIGS. 24 to 26 illustrate a twelfth preferred embodiment in accordance with the present invention in which a plurality of elongated apertures 11c-11c are formed on the upper surface 10c of the fryer body 10 along the end portions 11a, 11b and front end portion of the oil tank 11. On each aperture 11c, a filter is attached to prevent the oil from flowing into the fryer body 10. A fan 20 is provided at the front portion of the oil tank 11 within the fryer body 10, as shown in FIG. 26, to force an air flow into the fryer body 10 through apertures 10e, 10e and to guide it toward the apertures 11c-11c. The apertures 10e-10e are formed on a bottom wall 10d of the fryer body 10 under the fan 20.

With this construction, air flows which Jet upwardly from the apertures 11c-11c under operation of the fan 20, as shown in FIG. 25, 26 form an air curtain upon the outer periphery of the oil tank 11. This means that the air curtain acts the same role as the screen plates 19, 19 described in the eleventh embodiment. Thus, the air curtain cooperates with the rear wall 10a to form the large space portion E upon the oil surface with prevention of an air flow into the space portion E from the outside. As a result, the same operation and effect as those described in the eleventh embodiment is attained. Other operation and effect are the same as those of the first embodiment.

Figure 27:
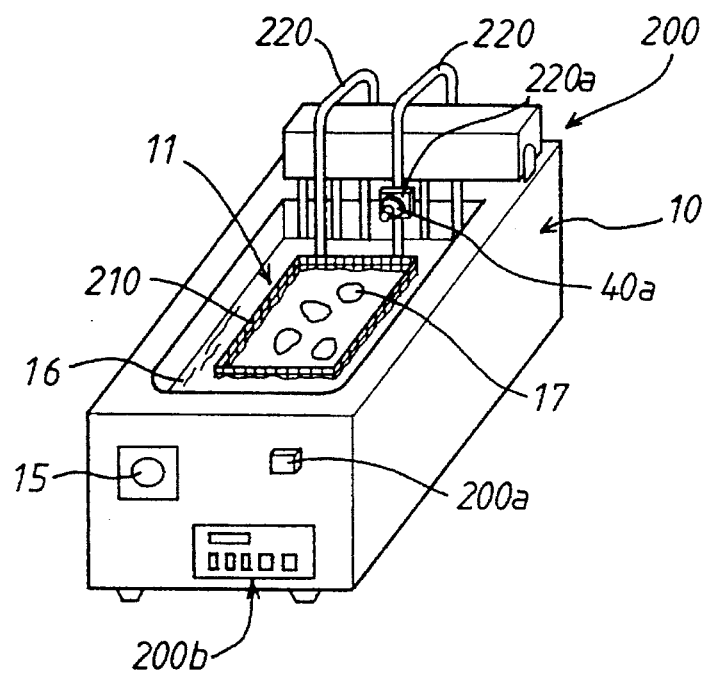
FIG. 27 is a perspective view of a thirteenth preferred embodiment of a fryer body according to the present invention.
Figure 28:
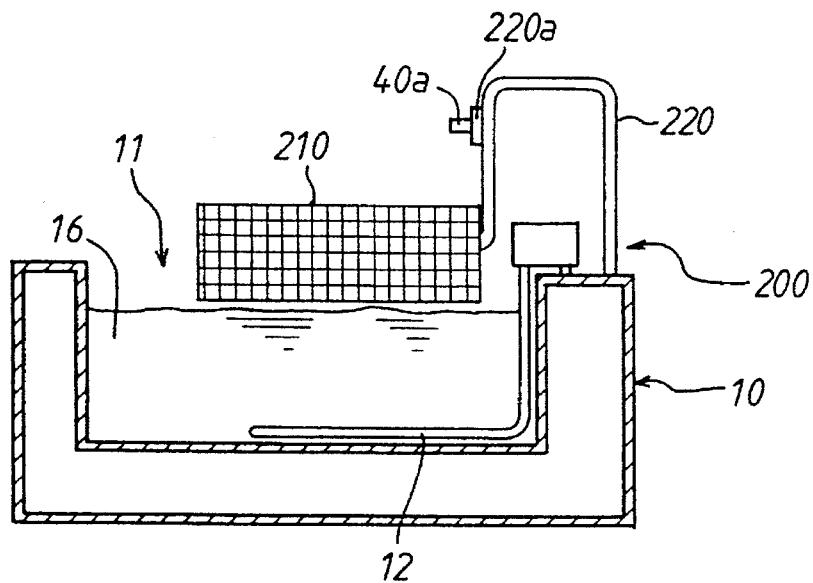
FIGS. 28 and 29 are views for explaining operation of an elevator shown in FIG. 27.
Figure 29:
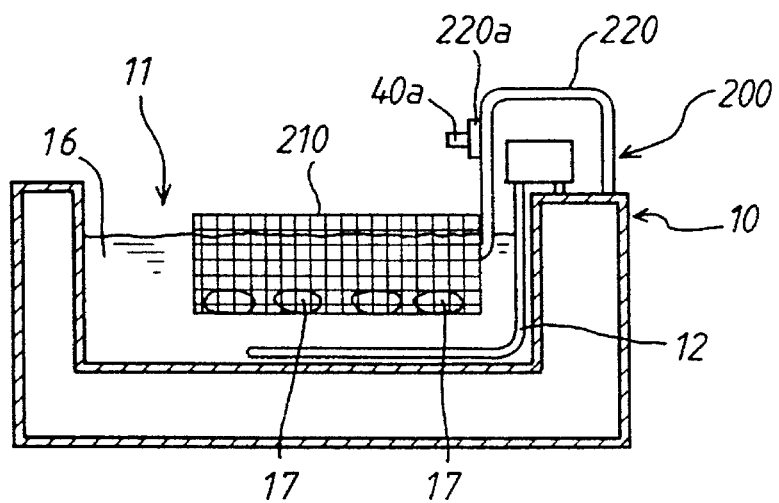

FIGS. 27–29 illustrate a thirteenth preferred embodiment in accordance with the present invention which is characterized in that an elevator 200 is mounted on the fryer body 10 described in the first embodiment and also in that the detecting portion 40a of the humidity detector 40 is secured to the elevator 200. The elevator 200 has a pair of elevator arms 220, 220 which are elevatably mounted on the rear wall of the fryer body 10. In this case, the elevator 200 is constructed to raise and lower the elevator arms 220, 220 by a cam mechanism (not shown) which is driven by a reversible motor (not shown). A frying basket 210 is mounted on the horizontal tip portions of the elevator arms 220, 220. When the arms 220, 220 are maintained at the end of the down stroke, the basket 210 is maintained within the oil 16 in the oil tank 16. When the arms 220, 220 are maintained at the end of the upper stroke, the basket 210 is maintained upon the oil surface. The reversible motor is driven in a clockwise or counter-clockwisely by actuation of an elevator switch 200a which is mounted on the front surface of the fryer body 10. In FIG. 27, reference character 200b indicates a panel switch which is actuated when temperature of the cooking oil 16 is adjusted in the predetermined temperature by way of the heater 12.

The detecting portion 40a of the humidity detector 40 is secured to an vertical portion of one of the arms 220, 220 by way of a plate 220a, as shown in FIGS. 27–29. When the basket 210 is maintained in the cooking oil 16, the detecting portion 40a is maintained near the upper portion of the oil surface so as to detect an amount of vapor rising from the frying materials in the basket 210. Other construction is the same as that of the first embodiment.

With this construction, prior to frying the frying materials, the basket 210 which is provided therein with the frying materials is lowered and maintained by the elevator 200 in the cooking oil 16. During process of frying the frying materials, an amount of vapor rising from the oil surface may be precisely detected by the humidity detector 40, because the detecting portion 40a is positioned upon the oil surface (FIGS. 27 and 29). This means that frying completion of the frying materials may be detected properly. At frying completion of the frying materials, the basket 210 with the frying materials is raised by the elevator 200 and maintained above the oil surface (see FIG. 28). Thus, the detecting portion 40a may be prevented from being unnecessarily exposed to an atmosphere upon the surface of the high temperature oil 16. Adhesion of oil mist to the detecting portion 40a may be also minimized.

Figure 30:
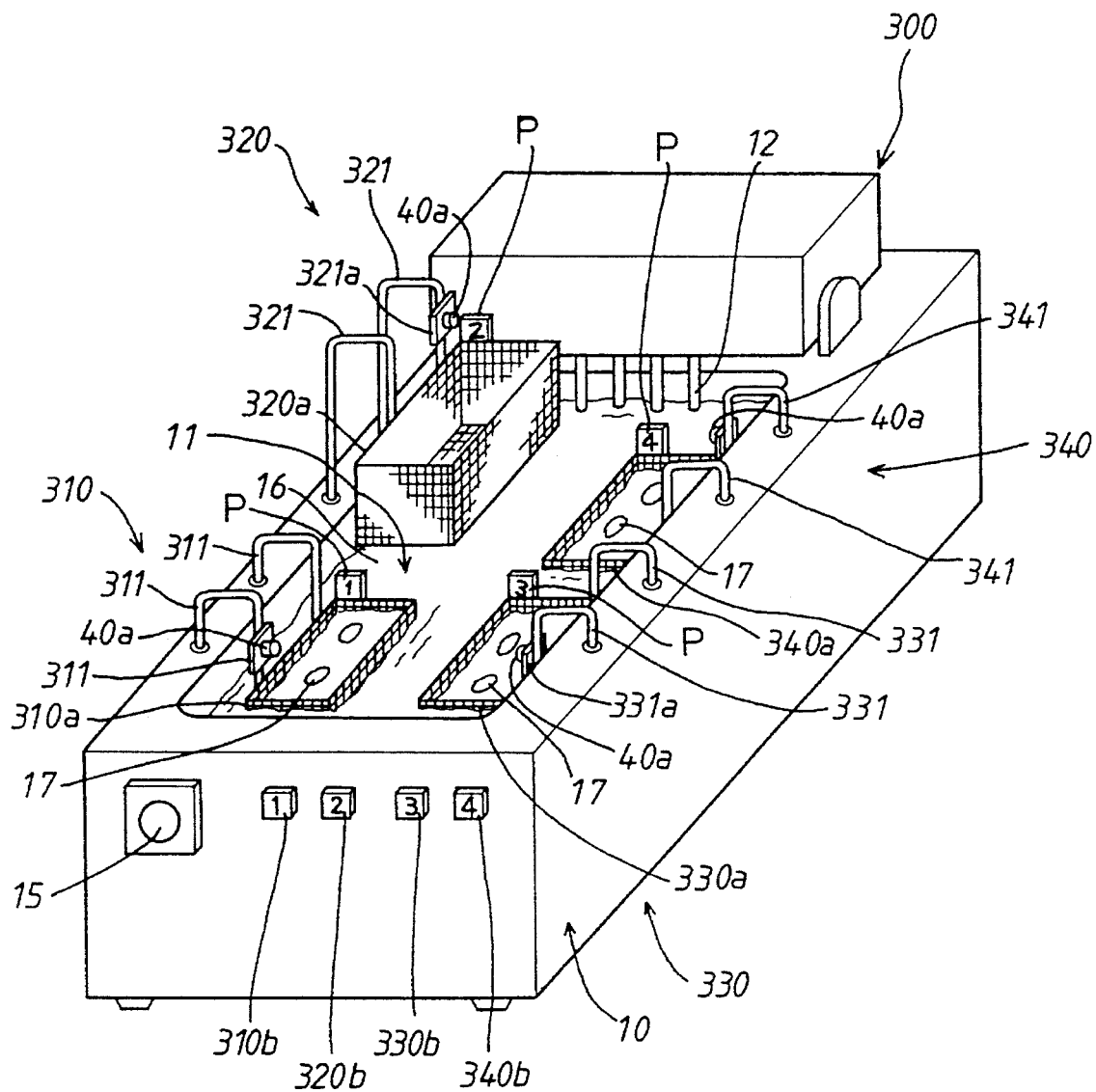
FIG. 30 is a perspective view of a modification of the thirteenth embodiment.
Figure 31:
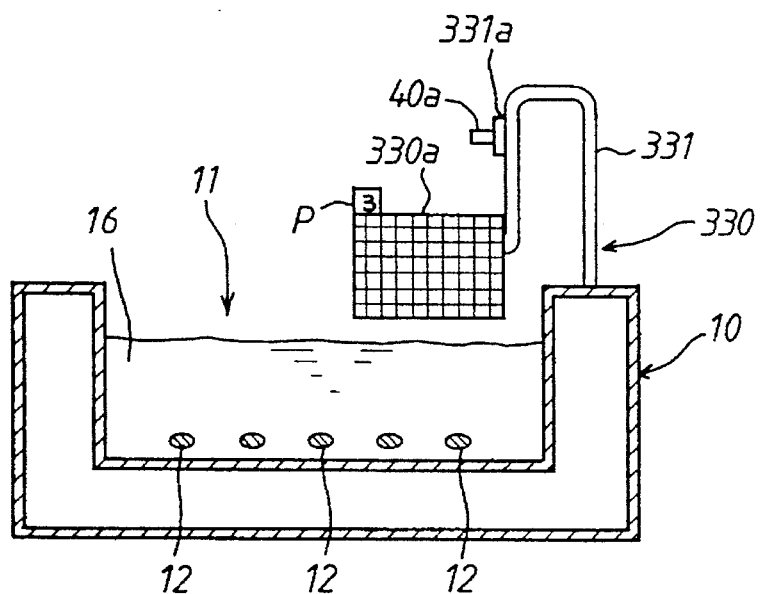
FIG. 31 and 32 are views for explaining operation of one of elevators shown in FIG. 30.
Figure 32:
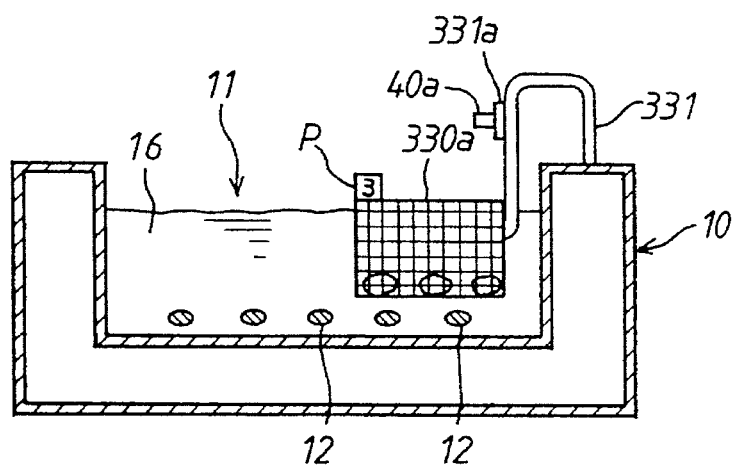

While in the thirteenth embodiment the single elevator 200 is mounted on the fryer body 10, it may be replaced with an elevator apparatus 300 having a plurality of elevators 310, 320, 330 and 340 which are mounted on the peripheral portion of the fryer body 10, as shown in FIGS. 30–32. In this case, detecting portions 40a are secured respectively by way of each plate 311a, 321a, 331a, 341a to a vertical portion of each one of both the elevator arms 311, 311; 321, 321; 331, 331; 341, 341. In addition, each of the elevators 310 to 340 has the same construction as that of the elevator 200.

With this construction, even if the types of frying materials in each basket of the elevators are different from each other, the frying materials in each basket may be efficiently fried simultaneously. Furthermore, each basket may be raised by each elevator at different times of frying completion of each frying materials. In addition, in FIG. 30 the reference characters 310a, 320a, 330a, 340a indicate a basket respectively. In FIGS. 30 to 32 the reference character P indicates a number plate defining the number of each of the elevators 310 to 340.

What is claimed is:

1. A cooking apparatus for frying food having an oil tank filled therein with cooking oil to be maintained in a heated condition by a heating means, the cooking apparatus comprising:

a housing having said oil tank disposed therein;

detection means for detecting an amount of vapor rising from the food after the food has been placed into the heated cooking oil, said detection means having a vapor detecting element mounted on said housing and located above the surface of said cooking oil to be directly exposed to the vapor rising from the food;

first means in said housing for generating a reference signal indicative of a predetermined amount of vapor; and second means in said housing coupled to said detection means and said first means for determining frying completion of the food when said detected amount of vapor becomes smaller than a value of said reference signal after being maintained larger than the value of said reference signal.

2. A cooking apparatus for frying food having an oil tank filled therein with cooking oil to be maintained in a heated condition by a heating means, the cooking apparatus comprising:

a housing having said oil tank disposed therein;

detection means for detecting an amount of vapor, including a first peak and a second peak amount of vapor, rising from the food after the food has been placed into the heated cooking oil, said detection means having a vapor detecting element mounted on said housing and located above the surface of said cooking oil to be directly exposed to the vapor rising from the food;

first means in said housing coupled to said detection means for determining whether or not said detected amount of vapor has reached the second peak thereof after having reached the first peak thereof, and for generating a decision signal if the second peak has been reached after the first peak; and second means in said housing coupled to said first means for determining if said detected amount of vapor has reached a predetermined amount of vapor after having received said decision signal, and for determining frying completion of the food if the predetermined amount has been reached.

3. A cooking apparatus as claimed in claim 2, further comprising means responsive to decision of said second means for informing the cook of frying completion of the food.

4. A cooking apparatus for frying food having an oil tank filled therein with cooking oil to be maintained in a heated condition by a heating means, the food being frying materials of which an interior portion needs not to be heated, the cooking apparatus comprising:

a housing having said oil tank disposed therein;

detection means for detecting an amount of vapor rising from the food after the food has been placed into the heated cooking oil said detection means having a vapor detecting element mounted on said housing and located above the surface of said cooking oil to be directly exposed to the vapor rising from the food; and determining means in said housing coupled to said detection means for determining whether or not said detected amount of vapor has reached a peak thereof, and for determining frying completion of the frying materials of which the interior portion needs not to be heated, when said peak has been reached.

5. A cooking apparatus as claimed in claim 4, further comprising means in said housing coupled to the determining means, responsive to a decision of said determining means for informing the cook of frying completion of the frying materials of which the interior portion needs not to be heated.

6. A cooking apparatus for frying food having an oil tank filled therein with cooking oil to be maintained in a heated condition by a heating means, the cooking apparatus comprising:

a housing having said oil tank disposed therein;

detection means for detecting an amount of vapor rising from the food after the food has been placed into the heated cooking oil, said detection means having a vapor detecting element mounted on said housing and located above the surface of said cooking oil to be directly exposed to the vapor rising from the food;

first means in said housing for generating a reference signal indicative of a predetermined amount of vapor, and second means in said housing coupled to said detection means and said first means for generating an output signal in comparison of said detected amount of vapor with said reference signal.

* * * * *